(12) United States Patent
Nakagawa et al.

(10) Patent No.: US 10,132,967 B2
(45) Date of Patent: Nov. 20, 2018

(54) METAL GLOSS DESIGN MEMBER

(71) Applicant: KAWASAKI JUKOGYO KABUSHIKI KAISHA, Hyogo (JP)

(72) Inventors: Fumihiro Nakagawa, Kakogawa (JP); Takahiro Osaki, Kobe (JP); Yuuki Takahashi, Kakogawa (JP); Seiji Hirata, Rayong (TH)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 1 day.

(21) Appl. No.: 14/929,689

(22) Filed: Nov. 2, 2015

(65) Prior Publication Data

US 2017/0123117 A1    May 4, 2017

(51) Int. Cl.
| | |
|---|---|
| *G02B 5/08* | (2006.01) |
| *B05D 5/06* | (2006.01) |
| *G02B 5/20* | (2006.01) |
| *C08J 7/00* | (2006.01) |
| *B05D 3/00* | (2006.01) |
| *B05D 7/02* | (2006.01) |

(52) U.S. Cl.
CPC ............. *G02B 5/085* (2013.01); *B05D 3/007* (2013.01); *C08J 7/00* (2013.01); *G02B 5/0808* (2013.01); *G02B 5/208* (2013.01); *B05D 5/067* (2013.01); *B05D 7/02* (2013.01)

(58) Field of Classification Search
None
See application file for complete search history.

(56) References Cited

U.S. PATENT DOCUMENTS

| | | | | |
|---|---|---|---|---|
| 4,971,841 | A | * | 11/1990 | Panush .................. B05D 5/068 427/407.1 |
| 7,393,557 | B2 | * | 7/2008 | Fleming .................... B32B 7/10 156/308.2 |
| 2006/0003107 | A1 | * | 1/2006 | Itakura ................... B05D 5/068 427/402 |
| 2007/0286995 | A1 | * | 12/2007 | Li ...................... B29C 45/14811 428/212 |
| 2009/0035540 | A1 | * | 2/2009 | Imamura .................. B05D 5/06 428/204 |
| 2011/0261443 | A1 | * | 10/2011 | Isojima ................. C03C 17/002 359/360 |
| 2012/0251819 | A1 | * | 10/2012 | Buhay ............... B32B 17/10036 428/336 |
| 2016/0185084 | A1 | * | 6/2016 | Kuno ........................ B32B 7/12 428/425.8 |

FOREIGN PATENT DOCUMENTS

| | | |
|---|---|---|
| JP | 2000-129448 | 5/2000 |
| JP | 2014-264354 | * 12/2014 |

\* cited by examiner

*Primary Examiner* — Derek S Chapel
(74) *Attorney, Agent, or Firm* — Wenderoth, Lind & Ponack, L.L.P.

(57) ABSTRACT

To provide a metal gloss design member provided with a light reflection film such as a silver thin film having satisfactory weather resistance even in outdoor use. A silver coating film 10 provided at least with a silver thin film 14 and with a topcoat layer 16 formed on the outer side in the stacking direction relative to the silver thin film 14 is formed on a substrate 3 and then the topcoat layer 16 has ultraviolet absorbability.

8 Claims, 15 Drawing Sheets

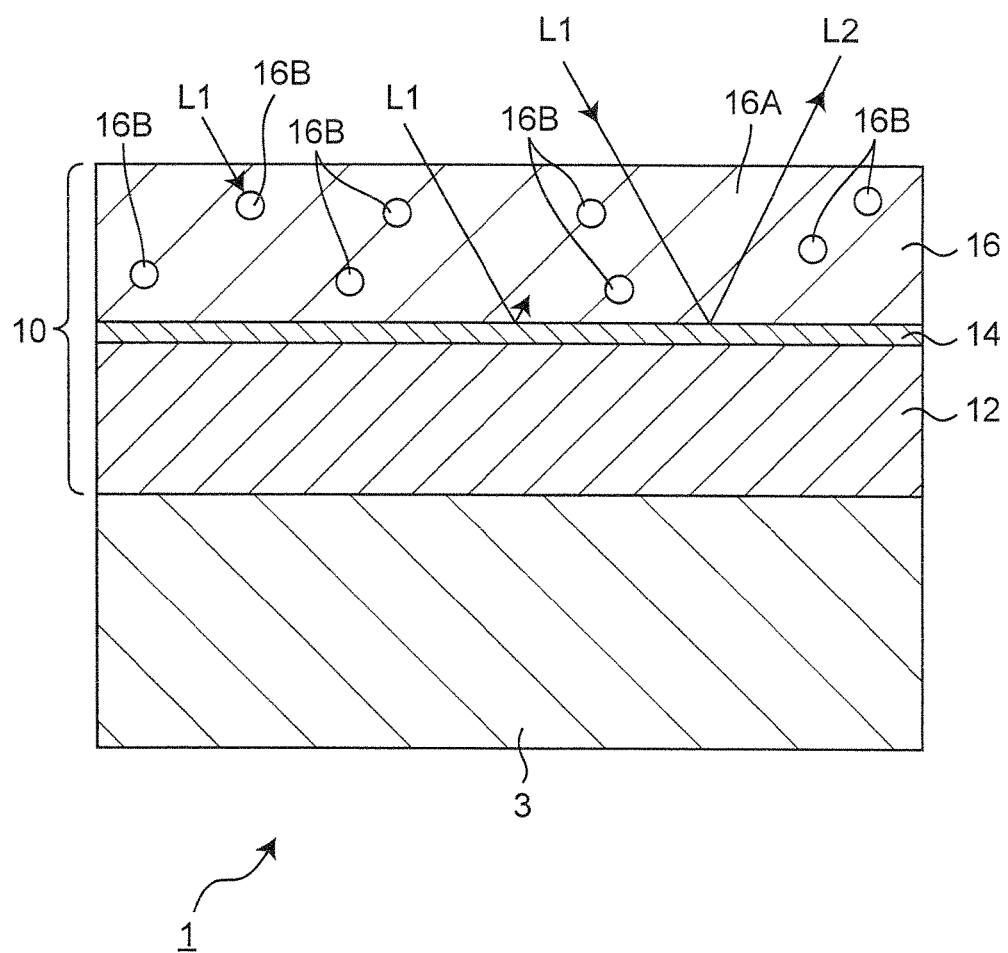

Fig.2A
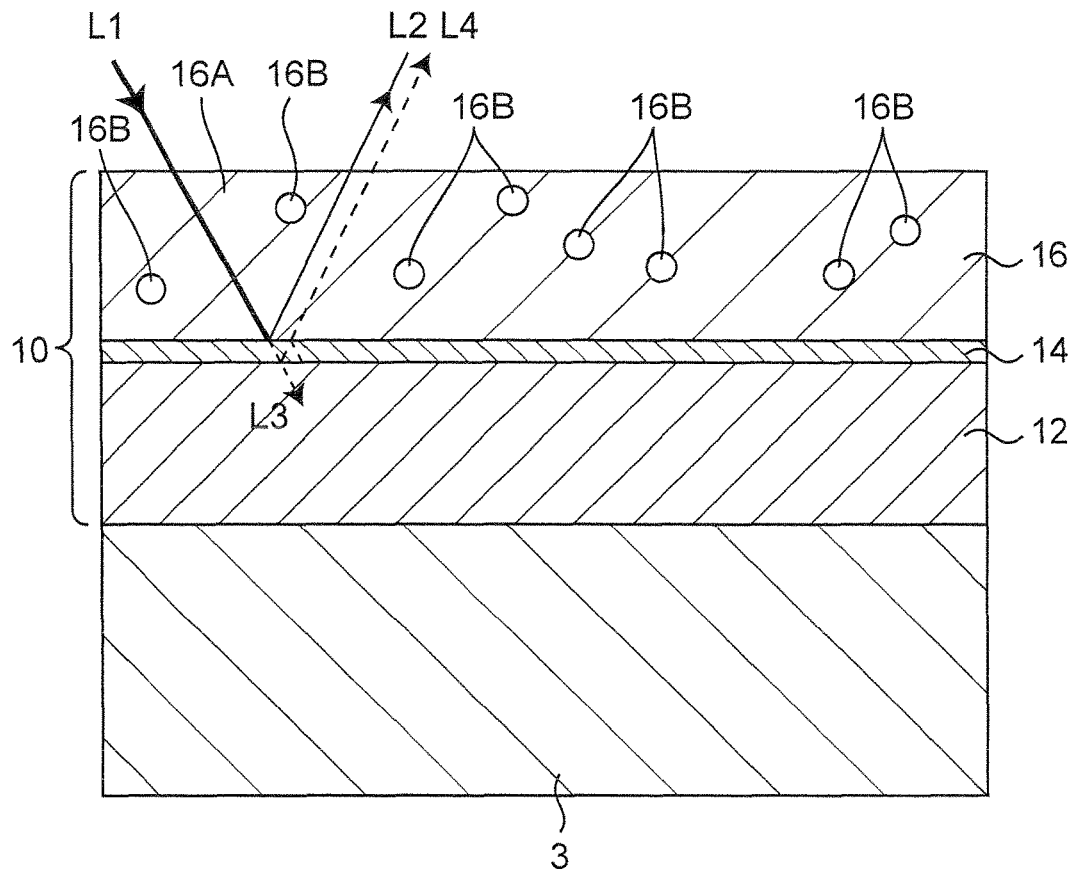
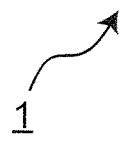
Fig.2B
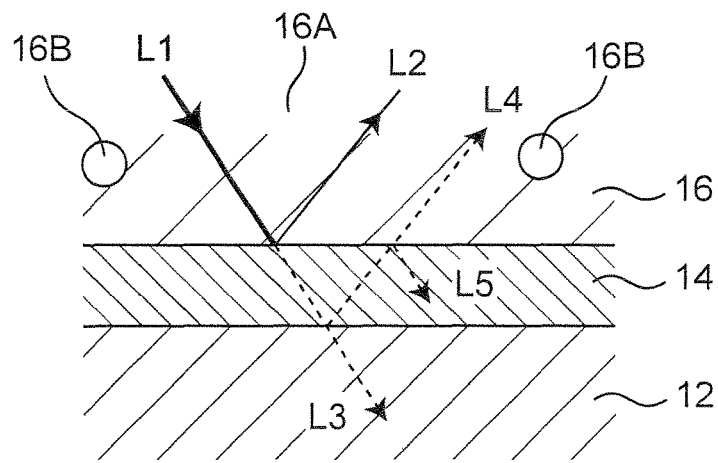

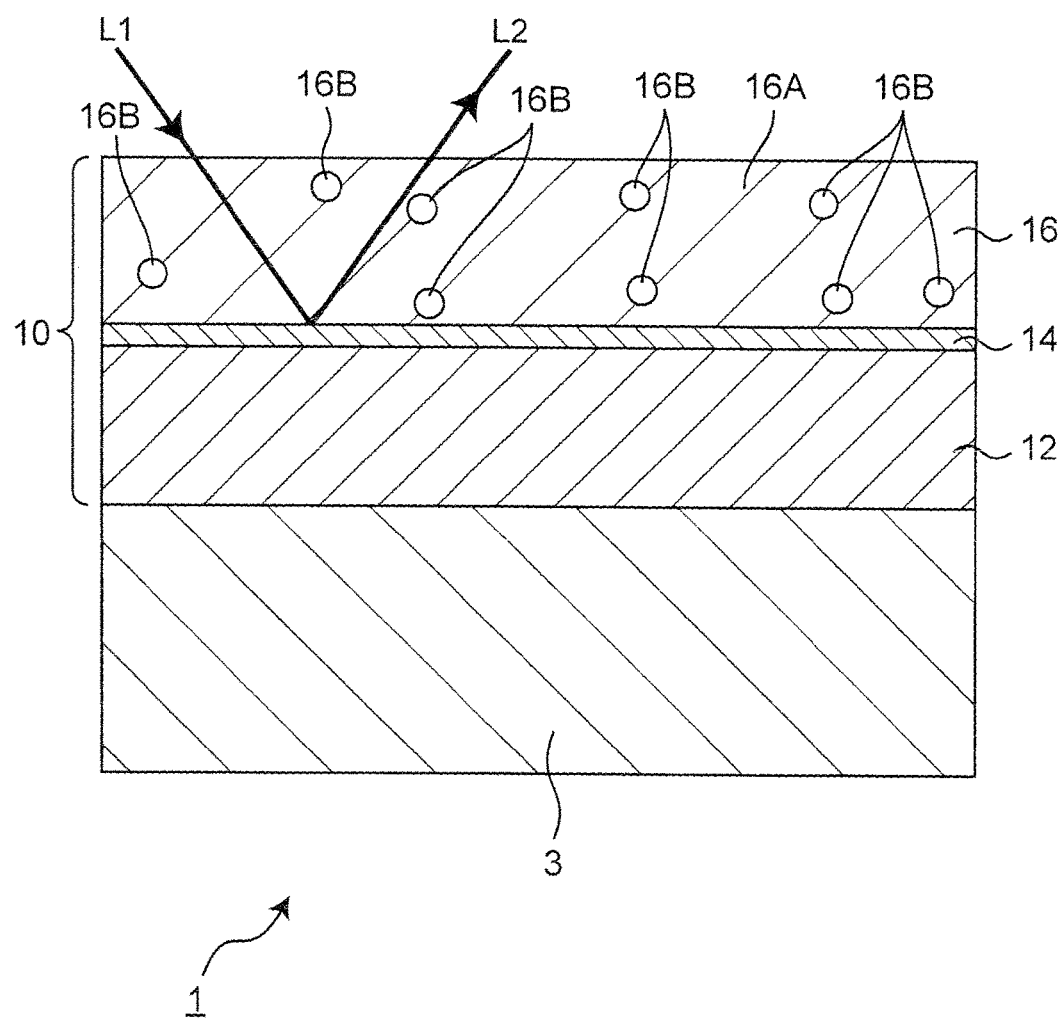

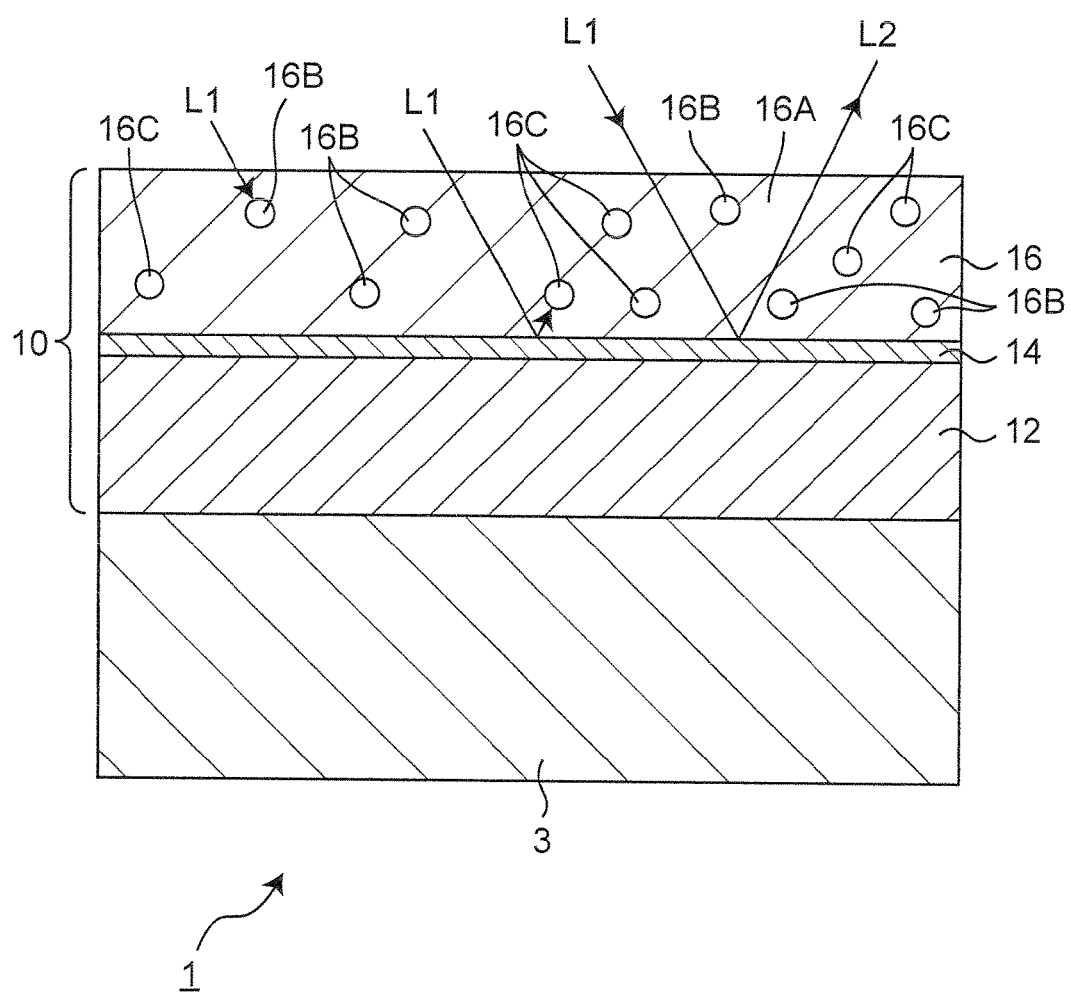

METAL GLOSS DESIGN MEMBER

BACKGROUND OF THE INVENTION

1. Field of the Invention

The present invention relates to a metal gloss design member in which a light reflection coating film provided with at least a light reflection film and a topcoat layer is formed on a substrate.

2. Description of the Prior Art

In a metal gloss design member, for example, a silver coating film containing a silver thin film is formed on a substrate. For example, Patent Document 1 discloses a technique that a silver plating layer is formed on the surface of a container and then a protection layer is formed on the surface of the silver plating layer.

PRIOR ART REFERENCES

Patent Documents

[Patent Document 1] JP Laid-open Publication No. 2000-129448

SUMMARY OF THE INVENTION

Nevertheless, in the case that the protection layer merely is formed on the silver thin film, satisfactory weather resistance is difficult to be obtained when a weather resistance test is performed that premises outdoor use.

Thus, a technical problem to be solved by the present invention is to provide a metal gloss design member provided with a light reflection film such as a silver thin film having satisfactory weather resistance even in outdoor use.

For the purpose of solving the above-mentioned technical problem, the present invention provides the following metal gloss design member.

That is, the metal gloss design member of the present invention is characterized in that a silver coating film provided at least with a silver thin film and with a topcoat layer formed on an outer side in a stacking direction relative to the silver thin film is formed on a substrate and that the topcoat layer has ultraviolet absorbability.

In the present invention, the topcoat layer has ultraviolet absorbability. Thus, in outdoor use, ultraviolet light contained in sunlight is absorbed by the topcoat layer so that light deterioration by ultraviolet light is suppressed. Accordingly, even when the metal gloss design member provided with a light reflection film such as a silver thin film is used outdoors over a long term, discoloration of the topcoat layer and the silver thin film becomes difficult to occur so that an effect of improvement of weather resistance is obtained.

BRIEF DESCRIPTION OF THE DRAWINGS

FIG. 1 is a schematic explanation diagram used for describing a metal gloss design member according to a first embodiment of the present invention and an optical effect thereof;

FIG. 2A is a schematic explanation diagram used for describing a metal gloss design member according to a first embodiment of the present invention and an optical effect thereof;

FIG. 2B is a main-part enlarged view used for describing an optical effect of a metal gloss design member shown in FIG. 2A;

FIG. 3 is a schematic explanation diagram used for describing a metal gloss design member according to a second embodiment of the present invention and an optical effect thereof;

FIG. 6 is a schematic explanation diagram used for describing a metal gloss design member according to a fifth embodiment of the present invention and an optical effect thereof;

DETAILED DESCRIPTION OF THE PREFFERED EMBODIMENTS

Figure 4A:
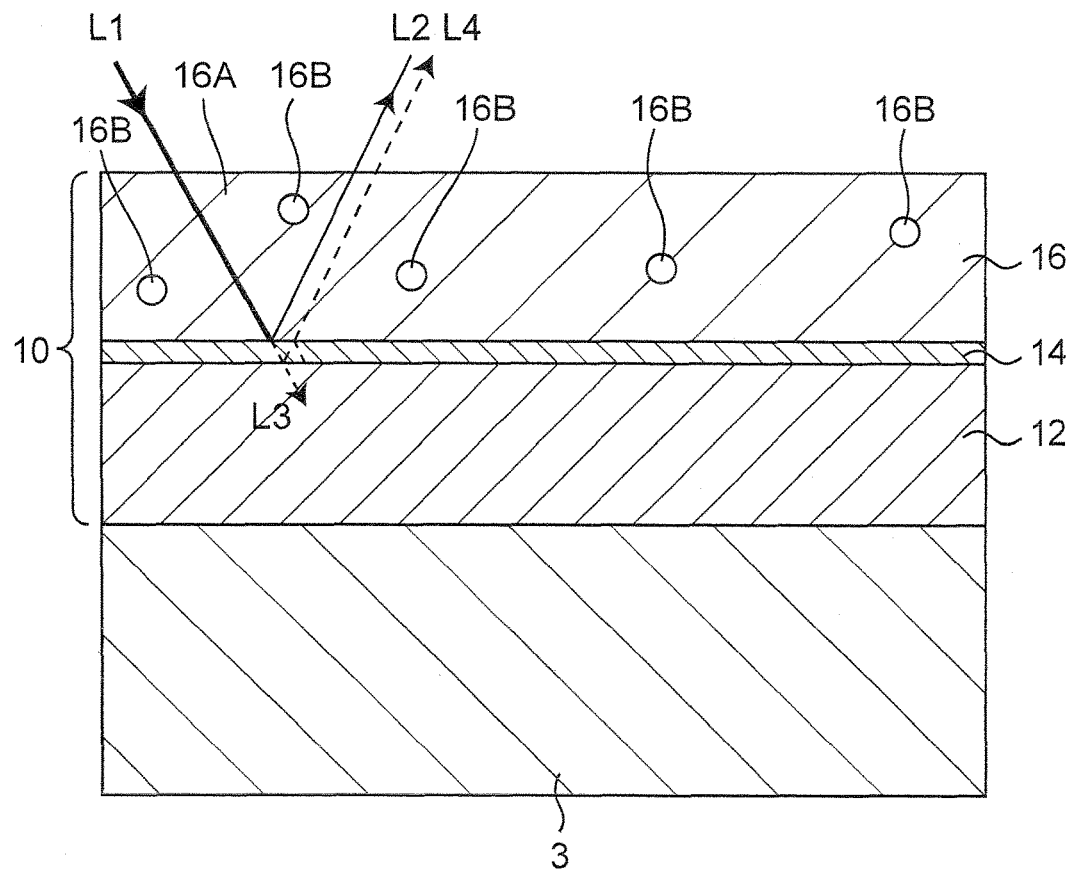
FIG. 4A is a schematic explanation diagram used for describing a metal gloss design member according to a third embodiment of the present invention and an optical effect thereof.

A metal gloss design member 1 according to the present invention is described below in detail with reference to FIG. 1.

(Overall Configuration of Metal Gloss Design Member 1)

FIG. 1 is a schematic explanation diagram showing a metal gloss design member (metallic luster design member) 1 according to a first embodiment of the present invention. The metal gloss design member 1 has a configuration that a light reflection coating film, specifically, a silver coating film 10, is formed on a substrate 3. The silver coating film 10 has a configuration that an undercoat layer 12, a silver thin film 14, and a topcoat layer 16 are stacked in this order from the substrate 3 side, in other words, on the outer side in the stacking direction relative to the substrate 3. Here, FIG. 1 is a schematic explanation diagram and hence the thicknesses of the undercoat layer 12, the silver thin film 14, and the topcoat layer 16 in the silver coating film 10 shown in FIG. 1 do not reflect the actual values.

(Substrate 3 of Metal Gloss Design Member 1)

As the substrate 3 of the metal gloss design member 1, various plastic materials or a metallic material such as aluminum is employed. For example, employable plastic materials include: ABS resin; polycarbonate resin; acrylic resin; vinyl chloride resin; epoxy resin; phenol resin; polyester resin such as polyethylene terephthalate (PET) resin and poly butylene terephthalate (PBT) resin; fluororesin; polyethylene (PE) resin; polypropylene (PP) resin; composite resin obtained from these; and fiber-reinforced plastic (FRP) reinforced with organic fibers such as nylon fibers and pulp fibers. These materials are, at all points, illustrative and not restrictive.

(Undercoat Layer 12 of Silver Coating Film 10)

The undercoat layer 12 is required to have a satisfactory adhesion to the substrate 3 and an excellent adhesion to the silver thin film 14 formed on the undercoat layer 12. Further, the undercoat layer 12 is required to have also a smooth surface. The undercoat layer 12 may be composed of urethane resin obtained by mixing together: base resin composed of polymer or oligomer having a terminal hydroxyl group like alkyd polyol, polyester polyol, acrylic polyol, polyether polyol, polycarbonate polyol, and polycaprolactone polyol; and a curing agent composed of an isocyanate compound. In particular, two-component polyurethane resin paint obtained by mixing together base resin composed of acrylic polyol and a curing agent composed of an isocyanate compound is preferable. For example, the employed acrylic polyol may be one having an acid number of 10 mgKOH/g or lower. For example, the employed isocyanate compound may be HDI (hexamethylene diisocyanate), XDI (meta-xylylene diisocyanate), or IPDI (isophorone diisocyanate), of a type not causing yellowing. As an example, two-component polyurethane resin (Base resin: product name 'MFS Undercoat Black Base Resin', product code ML-K (also referred to as 'ML Type'). Curing agent: product name 'MFS Undercoat Black Curing Agent', product code ML-K (also referred to as 'ML Type' or Revised AK21)) manufactured by Hyomenkakokenkyusho Co., Ltd. ('Hyoukaken Co., Ltd.' when noted in English) is employed as a material for the undercoat layer 12.

In a method of forming the undercoat layer 12 onto the substrate 3, the above-mentioned resin composition is dissolved into various well-known organic solvents and then coated onto the substrate 3. Further, the employed coating method is publicly known conventional one. For example, the employed method may be a gravure roll method, a reverse roll method, a dip roll method, a bar coater method, a die coater method, a curtain coater method, a knife coater method, an air spray method, an airless spray method, or a dip method. From the perspective of satisfactory surface smoothness, the adhesion to the substrate 3, and the manufacturing cost, the thickness of the undercoat layer 12 is preferably 5 μm or greater and 30 μm or smaller and remarkably preferably 20 μm or greater and 30 μm or smaller. When the thickness of the undercoat layer 12 is smaller than 5 μm, depressions and protrusions remain in the surface so that satisfactory surface smoothness is not obtained. When the thickness of the undercoat layer 12 exceeds 30 μm, the necessary drying time increases and hence the productivity decreases. However, the employed thickness of the undercoat layer 12 is not limited to the numerical values given above. Here, when the undercoat layer 12 further contains a colorant such as a pigment and a dye having a desired color, the undercoat layer 12 can be colored into a desired color.

(Silver Thin Film 14 of Silver Coating Film 10)

The silver coating film 10 includes a silver thin film 14 provided on the outer side in the stacking direction relative to the undercoat layer 12, in other words, provided on the undercoat layer 12. The silver thin film 14 may be manufactured by a dry process such as sputtering and vacuum vapor deposition. However, from the perspective of easily obtaining satisfactory silver metal gloss at a low cost, it is preferable that the silver thin film 14 is formed by a wet process of silver mirror plating.

The silver mirror plating is an is electroless plating method employing a silver mirror reaction. Prior to the silver mirror plating, the surface to be silver-mirror plated of the undercoat layer 12 is activated by using a surface control agent. In the silver mirror plating, ammoniacal silver nitrate ($[Ag(NH_3)_2]+OH^-$) referred to as Tollens reagent and a reducing agent solution are sprayed by using a double spray gun such as to be mixed together on the surface of the undercoat layer 12. The employed reducing agent is not limited to particular one and, for example, may be: sugar such as glucose; an organic compound having an aldehyde group such as glyoxal; sodium nitrite; or sodium thiosulfate. After the silver thin film 14 is formed by the silver mirror plating, in order that excessive silver mirror plating adhered to the surface may be removed, the surface of the silver thin film 14 is washed with pure water or deionized water. After that, the surface of the silver thin film 14 is modified by using a surface modifying agent so that the adhesion of the topcoat layer 16 to the silver thin film 14 is improved.

It is preferable that the spectral reflectivity of the silver thin film 14 is 10% or higher over a wavelength range of visible light (400 nm to 850 nm). The spectral reflectivity is more preferably 20% or higher and 99% or lower and yet more preferably 25% or higher and 75% or lower. From the perspectives of imparting of the optical characteristics by the silver thin film 14 and of the manufacturing cost, the thickness of the silver thin film 14 is preferably 0.02 μm or greater and 0.3 μm or smaller and remarkably preferably 0.05 μm or greater and 0.2 μm or smaller. However, the employed thickness of the silver thin film 14 is not limited to the numerical values given above. In order that appropriate light reflectivity and light transmissivity like in a so-called one-way mirror may be imparted to the silver thin film 14, the thickness of the silver thin film 14 is preferably 0.05 μm or greater and 0.1 μm or smaller. When the thickness of the silver thin film 14 is smaller than 0.05 μm, the fraction of light transmissivity becomes large. When the thickness of the silver thin film 14 is greater than 0.1 μm, the fraction of light reflectivity becomes large. Here, the silver thin film 14 need not unavoidably be in the form of a half mirror whose light reflectivity and light transmissivity are substantially equal to each other. When the thickness of the silver thin film 14 is changed so that the ratio between the light reflectivity and the light transmissivity is adjusted, the level of weather resistance can be optimized or, alternatively, the designability can be changed. For example, the ratio between the light reflectivity and the light transmissivity may be adjusted within a range from 20%:80% to 99%:1%. The silver thin film 14 has light reflectivity of reflecting at least a part of the incident light and hence may be referred to as a light reflection film. Then, the silver coating film 10 provided with the silver thin film 14 having light reflectivity and the topcoat layer 16 formed on the outer side in the stacking direction relative to the silver thin film 14 may be referred to as a light reflection coating film.

(Topcoat Layer 16 of Silver Coating Film 10)

The topcoat layer 16 is required to have light transmissivity over a wavelength range of visible light, a satisfactory adhesion to the silver thin film 14, and excellent weather resistance. The topcoat layer 16 may be composed of urethane resin obtained by mixing together: base resin composed of polymer or oligomer having a terminal hydroxyl group like alkyd polyol, polyester polyol, acrylic polyol, polyether polyol, polycarbonate polyol, and polycaprolactone polyol; and a curing agent composed of an isocyanate compound. Preferably, the topcoat layer 16 is composed of a resin composition in which an ultraviolet absorbing agent is added to two-component polyurethane resin paint obtained by mixing together acrylic polyol serving as base resin and an isocyanate compound serving as a curing agent. When necessary, various additives such as a light stabilizing agent, an antioxidizing agent, a thermostabilizing agent, and a leveling agent may be added to the topcoat layer 16. The light stabilizing agent is a radical scavenger for capturing radicals generated by photooxidation and a typical example of this is a hindered amine light stabilizer (HALS). For example, the employed acrylic polyol may be one having an acid number of 10 mgKCH/g or lower. For example, the employed isocyanate compound may be HDI (hexamethylene diisocyanate), XDI (meta-xylylene diisocyanate), or IPDI (isophorone diisocyanate), of a type not causing yellowing. As an example, two-component polyurethane resin (Base resin: product name 'FG Clear', product number 4207-065782. Curing agent: product name 'FG Clear Curing Agent', product number 6508-005784) manufactured by Saito Paint Co., Ltd. (developed by Fujimi Giken Co., Ltd.) is employed as a resin material for the topcoat layer 16.

Employable materials for the ultraviolet absorbing agent 16B of organic material include: benzotriazol, triazine, benzoxazine, salicylate ester, benzophenone, 2-cyanoacrylic ester, anthranilate, a cinnamon acid derivative, a camphor derivative, a benzal malonate derivative, resorcinol, oxanilide, dibenzoylmethane, a coumarin derivative, and a benzoic acid derivative. Further, as the ultraviolet absorbing agent 16B of inorganic material, in order that an ultraviolet absorbing effect may be obtained without deterioration in the light transmissivity over a wavelength range of visible light, ATO (antimony-doped tin oxide) or ITO (tin-doped indium oxide) having a mean particle diameter of 300 nm or smaller which is smaller than a wavelength range of visible light is preferable. Then, in order that a high light transmissivity may be obtained over a wavelength range of visible light, it is more preferable that the particle diameter is 100 nm or smaller. These ultraviolet absorbing agents 16B may be employed independently or in combination.

The content of the ultraviolet absorbing agent 16B of organic material is preferably 5 to 40 weight parts relative to 100 weight parts of the two-component polyurethane resin. Further, a content of 10 to 20 weight parts is remarkably preferable. The content of the ultraviolet absorbing agent 16B of inorganic material is preferably 20 to 40 weight parts relative to 100 weight parts of the two-component polyurethane resin. Further, a content of 25 to 35 weight parts is remarkably preferable. When the content of the ultraviolet absorbing agent 16B is excessively high, a possibility arises that the light transmissivity is deteriorated. When the content of the ultraviolet absorbing agent 16B is excessively low, a satisfactory ultraviolet absorbing effect cannot be obtained.

From the perspective of a satisfactory surface smoothness, the adhesion to the silver thin film 14, the capability of absorbing deterioration accelerating light, and the manufacturing cost, the thickness of the topcoat layer 16 is preferably 5 µm or greater and 50 µm or smaller and remarkably preferably 20 µm or greater and 30 µm or smaller. However, the employed thickness of the topcoat layer 16 is not limited to the numerical values given above.

In a method of forming the topcoat layer 16 onto the silver thin film 14, the above-mentioned resin composition is dissolved into a publicly known organic solvent of diverse kind and then coated onto the substrate 3. Further, the employed coating method may be publicly known conventional one. For example, the employed method may be a gravure roll method, a reverse roll method, a dip roll method, a bar coater method, a die coater method, a curtain coater method, a knife coater method, an air spray method, an airless spray method, or a dip method.

As schematically shown in FIG. 1, the topcoat layer 16 is composed of a resin composition containing: resin paint 16A; and the ultraviolet absorbing agent 16B having ultraviolet absorbability. In this case, when sunlight containing ultraviolet light and serving as incident light L1 hits the ultraviolet absorbing agent 16B, ultraviolet light within the incident light L1 is absorbed. The light component not having hit the ultraviolet absorbing agent 16B is not absorbed by the ultraviolet absorbing agent 16B and hence passes through the topcoat layer 16. The light that has not been absorbed by the ultraviolet absorbing agent 16B and that hence has passed through the topcoat layer 16 and then reached the silver thin film 14 is reflected as reflected light L2 by the silver thin film 14 and then passes through the topcoat layer 16 again. Within the reflected light L2, the light component not having been absorbed by the ultraviolet absorbing agent 16B in the topcoat layer 16 exits outward from the silver coating film 10.

Sunlight contains ultraviolet light serving as deterioration accelerating light that accelerates deterioration of the resin material. The ultraviolet light is composed of: near-ultraviolet light having a wavelength range from 200 nm to 400 nm; far-ultraviolet light having a wavelength range from 10 nm to 200 nm; and extreme ultraviolet light having a wavelength range of 10 nm or shorter. Within the near-ultraviolet light, radiation having a wavelength range from 320 nm to 400 nm is referred to as ultraviolet A (UV-A). Within the ultraviolet A (UV-A), radiation having a wavelength range from 320 nm to 370 nm is expected to have the property of accelerating light deterioration such as polymer chain scission and photooxidation in the topcoat layer 16 composed of the resin material. The term "ultraviolet light" in the present specification indicates, in a broad sense, near-ultraviolet light having a wavelength range from 200 nm to 400 nm and, in a narrow sense, ultraviolet A (UV-A) having a wavelength range from 320 nm to 400 nm. In a yet narrower sense, the term indicates radiation having a wavelength range from 320 nm to 370 nm. Thus, in the present specification, radiation having any one of the wavelength ranges defined above is referred to as ultraviolet light.

In the present embodiment, since the topcoat layer 16 contains the ultraviolet absorbing agent 16B, ultraviolet light having a wavelength range from 320 nm to 370 nm and accelerating light deterioration of the resin is absorbed by the ultraviolet absorbing agent 16B so that light deterioration the topcoat layer 16 is suppressed. Further, ultraviolet light reaching the silver thin film 14 is shielded by the ultraviolet absorbing agent 16B contained in the topcoat layer 16 so that deterioration such as blackening of the silver thin film 14 is suppressed.

Design members in a product (e.g., a vehicle such as a motorcycle) used outdoors over a long term are required to have weather resistance at a high level. In particular, in the metal gloss design member 1 to which a designability of metal gloss realized by the silver thin film 14 is imparted, the incident light L1 is reflected by the silver thin film 14. In the metal gloss design member 1 provided with the silver thin film 14, the light passes through the topcoat layer 16 twice in the forms of the incident light L1 and the reflected light L2. Thus, deterioration of the topcoat layer 16 easily progresses in comparison with a case that the silver thin film 14 is not provided.

In the present embodiment, the topcoat layer 16 is employed that having the property of absorbing ultraviolet light serving as deterioration accelerating light. By virtue of this, ultraviolet light within the light reaching the silver thin film 14 can be reduced and then ultraviolet light within the light reflected by the silver thin film 14 can be reduced. Thus, by virtue of the formation of the silver thin film 14, even in a case that the light passes through the topcoat layer 16 twice in the forms of the incident light L1 and the reflected light L2, deterioration of the topcoat layer 16 can be prevented.

Further, since the topcoat layer 16 has ultraviolet light absorbability, light deterioration of the topcoat layer 16 caused by ultraviolet light can be prevented and, at the same time, the ultraviolet light reaching the silver thin film 14 is reduced so that light deterioration of the silver thin film 14 caused by ultraviolet light can be prevented. By virtue of these, weather resistance at a high level is satisfied that is required in the metal gloss design member provided with the easily deteriorated silver thin film 14 and employed in a product used outdoors.

In a broad sense, the ultraviolet transmission set forth in the present specification indicates the average spectral transmittance over a near-ultraviolet wavelength range from 200 nm to 400 nm. More specifically, the ultraviolet transmission set forth in the present specification indicates the average spectral transmittance over an ultraviolet A (UV-A) wavelength range from 320 nm to 400 nm. In particular, the ultraviolet transmission set forth in the present specification indicates the average spectral transmittance for ultraviolet light having a wavelength range from 320 nm to 370 nm expected to participate in acceleration of the light deterioration. Here, the wavelength range expected to participate in acceleration of the light deterioration varies depending on the construction material of the resin employed in the topcoat layer 16. Thus, the wavelength range values given here are merely exemplary. In order that the light deterioration by ultraviolet light may be suppressed, within the wavelength range from 320 nm to 370 nm, the ultraviolet transmission of the topcoat layer 16 is preferably 10% or lower, more preferably 5% or lower, and yet more preferably 1% or lower. In other words, within the wavelength range from 320 nm to 370 nm, the ultraviolet absorbance (the ultraviolet shielding property) of the topcoat layer 16 is preferably 90% or higher, more preferably 95% or higher, and yet more preferably 99% or higher.

Here, when the topcoat layer 16 has ultraviolet absorbability, ultraviolet light serving as deterioration accelerating light is absorbed so that light deterioration of the topcoat layer 16 is suppressed. Thus, the silver coating film 10 need not unavoidably includes the undercoat layer 12. Further, employable configurations are not limited to that the topcoat layer 16 is composed of two-component polyurethane resin. That is, the topcoat layer 16 may be composed of another resin. In addition to the configuration that the topcoat layer contains the ultraviolet absorbing agent 16B, a configuration may be employed that the topcoat layer 16 itself has ultraviolet absorbability.

With reference to FIGS. 2A and 2B, the metal gloss design member 1 according to the first embodiment is described below in which the silver coating film 10 provided with the silver thin film 14 having light reflectivity and light transmissivity is formed on the substrate 3.

As shown in FIG. 2A, when the thickness of the silver thin film 14 is reduced, in a case that the silver thin film 14 has light transmissivity in the stacking direction, a part of the incident light L1 having reached the silver thin film 14 is transmitted through the silver thin film 14. Then, apart of the remaining incident light L1 having reached the silver thin film 14 is reflected by the silver thin film 14, then passes through the topcoat layer 16 again, and then exits as the reflected light L2 outward from the silver coating film 10. Here, the quantity of the reflected light L2 is inversely proportional to the transmission of the silver thin film 14. The quantity of the light that is a part of the incident light L1 having reached the silver thin film 14 and that has been transmitted through the silver thin film 14 and then has reached the undercoat layer 12 is lower than the quantity of the incident light L1 having reached the silver thin film 14. A part of the light having been transmitted through the silver thin film 14 is reflected by the interface between the silver thin film 14 and the undercoat layer 12 and then reaches the silver thin film 14 again.

A part of the light having reached the silver thin film 14 from the undercoat layer 12 side is transmitted through the silver thin film 14 as thin-film transmitted light L4, then passes through the topcoat layer 16, and then exits outward from the silver coating film 10. As shown in FIG. 2B, a part of the remaining light having reached the silver thin film 14 from the undercoat layer 12 side is reflected as turn-back light L5 which is reflected in a turn-back manner in the interface between the silver thin film 14 and the undercoat layer 12. Thus, this part of the light is prevented from traveling outward in the stacking direction. The light not reflected by the interface between the silver thin film 14 and the undercoat layer 12 and hence traveling through the inside of the undercoat layer 12 is diffused or absorbed as diffused light L3 in the undercoat layer 12.

The light having reached the undercoat layer 12 travels in a manner of being separated into the diffused light L3, the thin-film transmitted light L4, and the turn-back light L5. Thus, the quantity of the light having been transmitted through the silver thin film 14 as the thin-film transmitted light L4 and then traveling outward in the stacking direction is lower than the quantity of the light having reached the undercoat layer 12. Further, actually, a silver-thin-film transmission loss and an interface reflection loss between the silver thin film 14 and the undercoat layer 12 arise and hence the quantity of the thin-film transmitted light L4 decreases further.

That is, the quantity of the light (reflected light L2+thin-film transmitted light L4) passing through the topcoat layer 16 from the silver thin film 14 toward the outer side in the stacking direction becomes lower than the quantity of the light incident into the silver thin film 14 by the amount corresponding to the diffused light 13, the turn-back light L5, and the above-mentioned loss components.

Thus, in the configuration that the silver thin film 14 has light transmissivity, the total quantity of the light passing through the topcoat layer 16 from the silver thin film 14 toward the outer side in the stacking direction decreases in comparison with a case that the silver thin film 14 does not have light transmissivity. Accordingly, even when deterioration accelerating light enters the topcoat layer 16, damage to the topcoat layer 16 becomes small and hence weather resistance is improved.

As described above, when the silver coating film 10 includes the silver thin film 14, the light passes through the topcoat layer 16 twice in the forms of the incident light L1 entering the silver thin film 14 and the reflected light L2 reflected by the silver thin film 14. Thus, deterioration of the topcoat layer 16 easily progresses in comparison with a case that the silver coating film 10 does not include the silver thin film 14.

In the present embodiment, in addition to the configuration that the topcoat layer 16 has the property of absorbing deterioration accelerating light, the silver thin film 14 has light transmissivity. Even in a case that the silver coating film 10 is formed such that the light containing the reflected light L2 reflected from the silver thin film 14 passes through the topcoat layer 16 twice, the quantity of the light passing through the topcoat layer 16 from the silver thin film 14 toward the outer side in the stacking direction can be reduced and hence deterioration of the topcoat layer 16 can be suppressed further. Thus, weather resistance at a high level is satisfied that is required in the metal gloss design member 1 provided with the easily deteriorated silver thin film 14 and employed in a product used outdoors.

The silver thin film 14 may be constructed as a half mirror whose light reflectivity and light transmissivity are substantially equal to each other. According to this configuration, depending on the direction of viewing by a person, silver metal gloss of the silver thin film 14 appears by virtue of the reflected light L2 reflected by the surface of the silver thin film 14 or, alternatively, the surface color of the undercoat layer 12 appears by virtue of the thin-film transmitted light 14 reflected by the surface of the undercoat layer 12. Thus, the color tone of the silver coating film 10 can be changed depending on the direction of viewing by a person. Further, for example, a configuration may be employed that a decorative pattern such as characters and symbols is provided in the surface of the undercoat layer 12. According to this configuration, depending on the direction of viewing by a person, the decorative pattern appears or disappears so that a unique designability can be achieved.

Further, the configuration that the silver thin film 14 shown in FIG. 2 has light transmissivity is different from and independent of the configuration that the topcoat layer 16 shown in FIG. 1 contains the ultraviolet absorbing agent 16B. However, these configurations are in common with each other in the point of view that the quantity of ultraviolet light serving as deterioration accelerating light and passing through the topcoat layer 16 is reduced so that light deterioration of the topcoat layer 16 is suppressed and weather resistance is improved. Since the configuration shown in FIG. 1 and the configuration shown in FIG. 2 are different from and independent of each other, in addition to the configuration that they are combined together, any one alone of the configurations may be employed so that weather resistance in the topcoat layer 16 may be improved.

Here, when the silver thin film 14 has light transmissivity, the thin-film transmitted light L4 transmitted through the silver thin film 14 and then interacting with the undercoat layer 12 so as to exit contains the light reflected by the surface of the undercoat layer 12 and hence presents the surface color in the undercoat layer 12 to the observer. Thus, when the undercoat layer 12 contains a colorant of desired color, the color of the colorant in the undercoat layer 12 is added to the silver metal gloss of the silver thin film 14 so that a variation in the silver color in the silver coating film 10 can be widened. For example, a black colorant is contained in the undercoat layer 12, the silver coating film 10 presents a unique black color referred to as so-called black chrome plating so that a unique designability such as a metal luster feeling and a high-class feeling can be obtained.

In particular, when the undercoat layer 12 is colored into a color such as black having a low lightness, the light absorption in the undercoat layer 12 increases and hence the light reflected by the surface of the undercoat layer 12 can be reduced. Further, the topcoat layer 16 may contain a colorant. When the topcoat layer 16 contains a colorant, the silver coating film 10 can present complicated color tone.

With reference to FIG. 3, the metal gloss design member 1 according to a second embodiment is described below in which the silver coating film 10 provided with the silver thin film 14 having a relatively high light reflectivity is formed on the substrate 3. The second embodiment is in common with the first embodiment except for the optical property of the silver thin film 14.

In the second embodiment shown in FIG. 3, the silver thin film 14 has a high light reflectance, that is, the thickness of the silver thin film 14 is sufficiently thick. Thus, a majority of incident light L1 is reflected by the silver thin film 14 and hence the incident light L1 becomes difficult be transmitted through the silver thin film 14 in the stacking direction. When the incident light L1 is reflected by the silver thin film 14, light having substantially the same quantity as the incident light L1 having reached the silver thin film 14 passes through the topcoat layer 16 as reflected light L2 and then exits outward from the silver coating film 10. As a result, in the silver coating film 10 provided with the silver thin film 14 having a relatively high light reflectivity, the quantity of the light passing through the topcoat layer 16 becomes larger than in the silver thin film 14 having light transmissivity.

Thus, in the silver coating film 10 provided with the thick silver thin film 14 in which a majority of the incident light L1 is reflected by the silver thin film 14, similarly to the first embodiment, when the topcoat layer 16 has the property of absorbing ultraviolet light serving as deterioration accelerating light, light deterioration of the topcoat layer 16 is suppressed and weather resistance is improved. When weather resistance at a high level is not required, in some cases, a weather resistance evaluation criterion is satisfied.

Figure 4B:
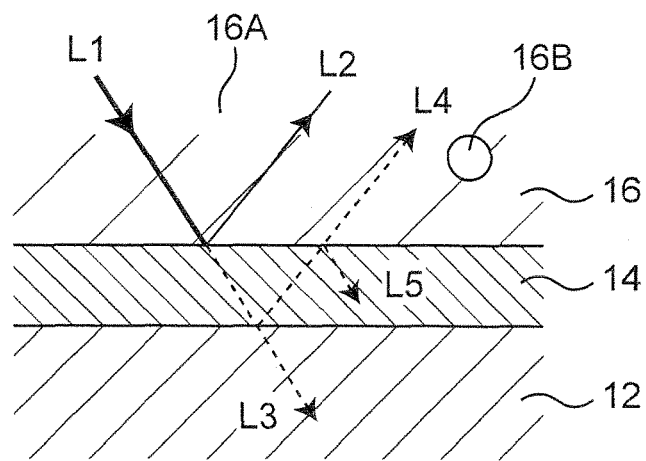
FIG. 4B is a main-part enlarged view used for describing an optical effect of a metal gloss design member shown in FIG. 4A.

With reference to FIGS. 4A and 4B, the metal gloss design member 1 according to a third embodiment is described below in which the silver coating film 10 provided with the topcoat layer 16 in which the property of absorbing ultraviolet light serving as deterioration accelerating light is not sufficient is formed on the substrate 3. The third embodiment is in common with the first embodiment except for the property of absorbing deterioration accelerating light in the topcoat layer 16.

In the third embodiment shown in FIGS. 4A and 4B, the property of absorbing deterioration accelerating light is not sufficient, that is, a necessary amount of the ultraviolet absorbing agent 16B in the first embodiment is not contained. Thus, the ultraviolet light passing through the topcoat layer 16 is not sufficiently absorbed.

Thus, in the coating film 10 provided with the topcoat layer 16 in which ultraviolet light is not sufficiently absorbed, similarly to the first embodiment, when the silver thin film 14 has light transmissivity, light deterioration of the topcoat layer 16 is suppressed and weather resistance is improved. When weather resistance at a high level is not required, in some cases, a weather resistance evaluation criterion is satisfied.

Figure 5:
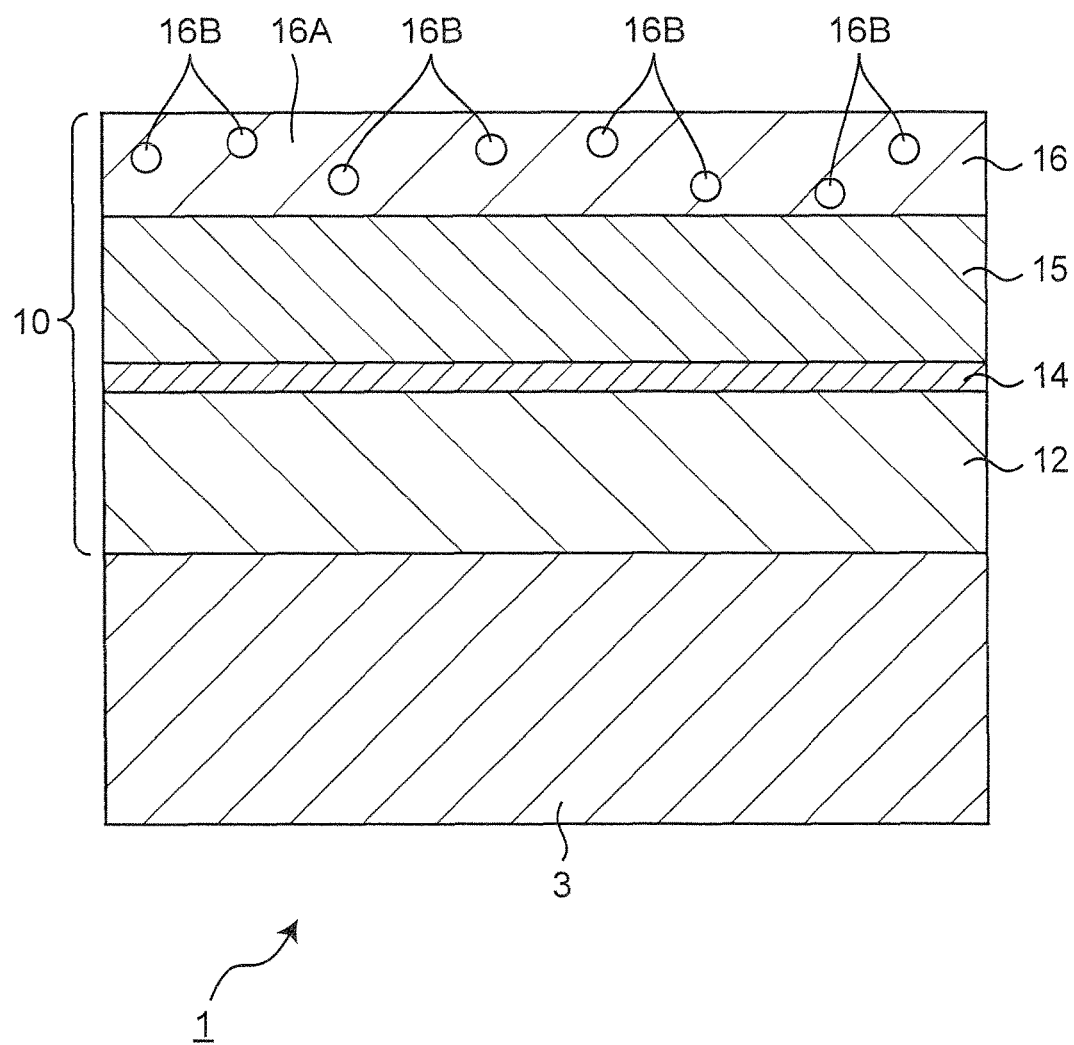
FIG. 5 is a schematic explanation diagram showing a metal gloss design member according to a fourth embodiment of the present invention.

Further, in the metal gloss design member 1 according to a fourth embodiment shown in FIG. 5, an undercoat layer 12, a silver thin film 14, an intermediate coat layer 15, and a topcoat layer 16 are stacked on the outer side in the stacking direction relative to the substrate 3. The configuration is similar to the first embodiment except for the intermediate coat layer 15. The intermediate coat layer 15 is formed for protecting the silver thin film. 14 so as to stabilize the silver thin film 14. The intermediate coat layer 15 excels in the adhesion to the silver thin film 14 and with the topcoat layer 16. For example, the intermediate coat layer 15 may be composed of acrylic-silicone resin.

With reference to FIG. 6, the metal gloss design member 1 according to a fifth embodiment is described below. In the fifth embodiment, the silver coating film 10 provided with the topcoat layer 16 having ultraviolet absorbability and infrared absorbability is formed on the substrate 3. The fifth embodiment is characterized in that the topcoat layer 16 further has infrared absorbability. The other points are in common with the first embodiment.

In addition to ultraviolet light, sunlight contains infrared light serving as deterioration accelerating light that causes deterioration of the resin material. Within the infrared light contained in sunlight, near-infrared light having a wavelength range approximately from 850 nm to 2500 nm causes a temperature rise in the topcoat layer 16 composed of the resin material. This causes a possibility that thermal deterioration of the topcoat layer 16 is accelerated. In the thermal deterioration caused by infrared light, so-called yellowing occurs in which the resin color becomes yellow.

As schematically shown in FIG. 6, the topcoat layer 16 is composed of a resin composition containing an infrared absorbing agent 16C in addition to the resin paint 16A and the ultraviolet absorbing agent 16B. In this case, when sunlight containing ultraviolet light and infrared light hits the ultraviolet absorbing agent 16B as the incident light L1, an ultraviolet light component within the incident light L1 is absorbed. Further, when the incident light L1 hits the infrared absorbing agent 16C, an infrared light component within the incident light L1 is absorbed. The light component not having hit the ultraviolet absorbing agent 16B or the infrared absorbing agent 16C is not absorbed by the ultraviolet absorbing agent 16B or the infrared absorbing agent 16C and then passes through the topcoat layer 16. The light that has not been absorbed by the ultraviolet absorbing agent 16B or the infrared absorbing agent 16C and that hence has passed through the topcoat layer 16 and then reached the silver thin film 14 is reflected as reflected light L2 by the silver thin film 14 and then passes through the topcoat layer 16 again. The light component within the reflected light L2 not having been absorbed by the ultraviolet absorbing agent 16B or the infrared absorbing agent 16C in the topcoat layer 16 exits outward from the silver coating film 10.

In order to investigate the weather resistance of the silver coating film 10, a test (e.g., an accelerated weathering test (JIS K 5400) employing a carbon arc sunshine weather meter) is performed in which light irradiation is performed over 1000 hours or longer. In the accelerated weathering test, the configuration that the topcoat layer 16 has infrared absorbability contributes to a situation that the incident light L1 and the reflected light L2 of infrared light are reduced and thereby a temperature rise in the topcoat layer 16 is suppressed so that yellowing of the topcoat layer 16 is prevented.

Employable materials for the infrared absorbing agent 16C of organic material include a diimonium dye, a phthalocyanine dye, a dithiol metal complex dye, a substituted benzene dithiol metal complex dye, a cyanine dye, and a squarylium dye. Further, employable materials for the infrared absorbing agent 16C of inorganic material include tin-doped indium oxide particulates, tin oxide particulates, and zinc oxide particulate. These infrared absorbing agents 16C may be employed independently or in combination. Here, as described above, a preferable material employed as the infrared absorbing agent 16C is one easily absorbing near-infrared light imparting remarkable thermal damage within infrared light.

The content of the infrared absorbing agent 16C of organic material is preferably 0.15 to 10 weight parts relative to 100 weight parts of the two-component polyurethane resin. Further, a content of 0.5 to 5 weight parts is more preferable. The content of the infrared absorbing agent 16C of inorganic material is preferably 0.1 to 10 weight parts relative to 100 weight parts of the two-component polyurethane resin. Further, a content of 0.5 to 2 weight parts is more preferable. When the content of the infrared absorbing agent 16C is excessively high, a possibility arises that that the physical properties of the silver coating film 10 are deteriorated. When the content of the infrared absorbing agent 16C is excessively low, a satisfactory infrared absorbing effect cannot be obtained. In addition to the configuration that the topcoat layer 16 contains the infrared absorbing agent 16C, a configuration may be employed that the topcoat layer 16 itself has infrared absorbability.

Figure 7A:
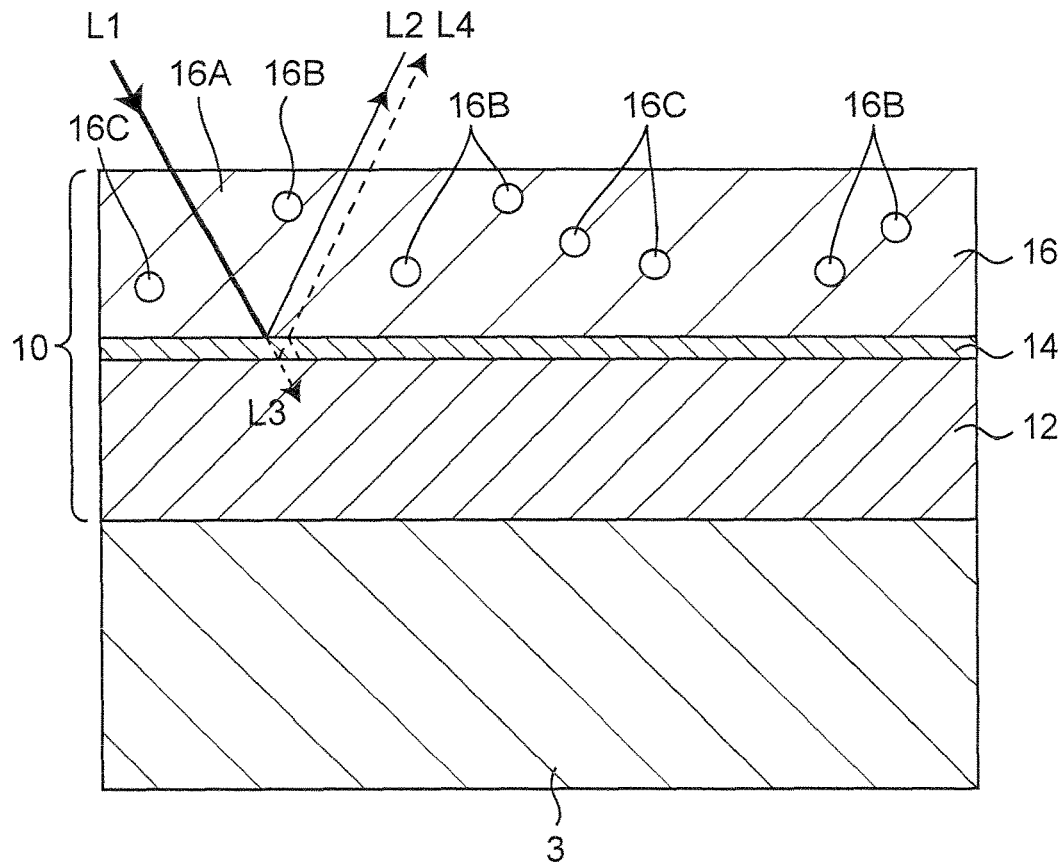
FIG. 7A is a schematic explanation diagram used for describing a metal gloss design member according to a fifth embodiment of the present invention and an optical effect thereof.
Figure 7B:
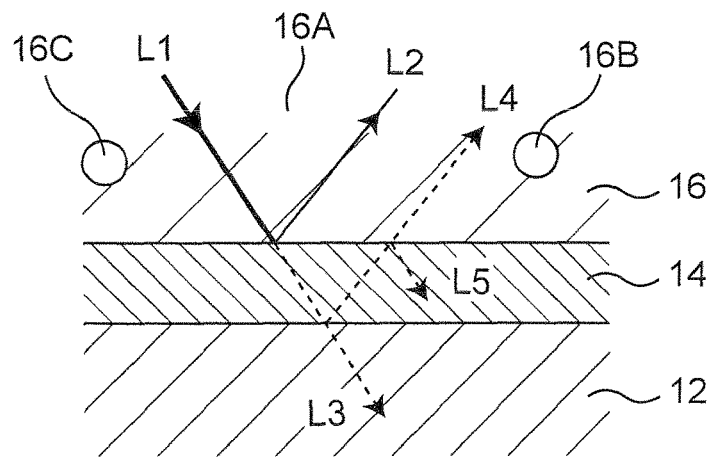
FIG. 7B is a main-part enlarged view used for describing an optical effect of a metal gloss design member shown in FIG. 7A.

In the metal gloss design member 1 according to the fifth embodiment shown in FIGS. 7A and 7B, the silver thin film 14 has light reflectivity and light transmissivity and, at the same time, the silver coating film 10 in which the topcoat layer 16 containing the ultraviolet absorbing agent 16B and the infrared absorbing agent 16C is formed on the substrate 3.

In the fifth embodiment, the silver thin film 14 has light transmissivity in addition to light reflectivity and, at the same time, the topcoat layer 16 has the property of absorbing infrared light in addition to ultraviolet light. Even in a case that the silver coating film 10 is formed such that the light containing the reflected light L2 reflected from the silver thin film 14 passes through the topcoat layer 16 twice, the quantity of the ultraviolet light and the infrared light passing through the topcoat layer 16 from the silver thin film 14 toward the outer side in the stacking direction can be reduced. Since the quantity of ultraviolet light and infrared light serving as deterioration accelerating light is reduced, deterioration of the topcoat layer 16 can be suppressed. Thus, weather resistance at a high level is satisfied that is required in the metal gloss design member 1 provided with the easily deteriorated silver thin film 14 and employed in a product used outdoors.

Figure 8:
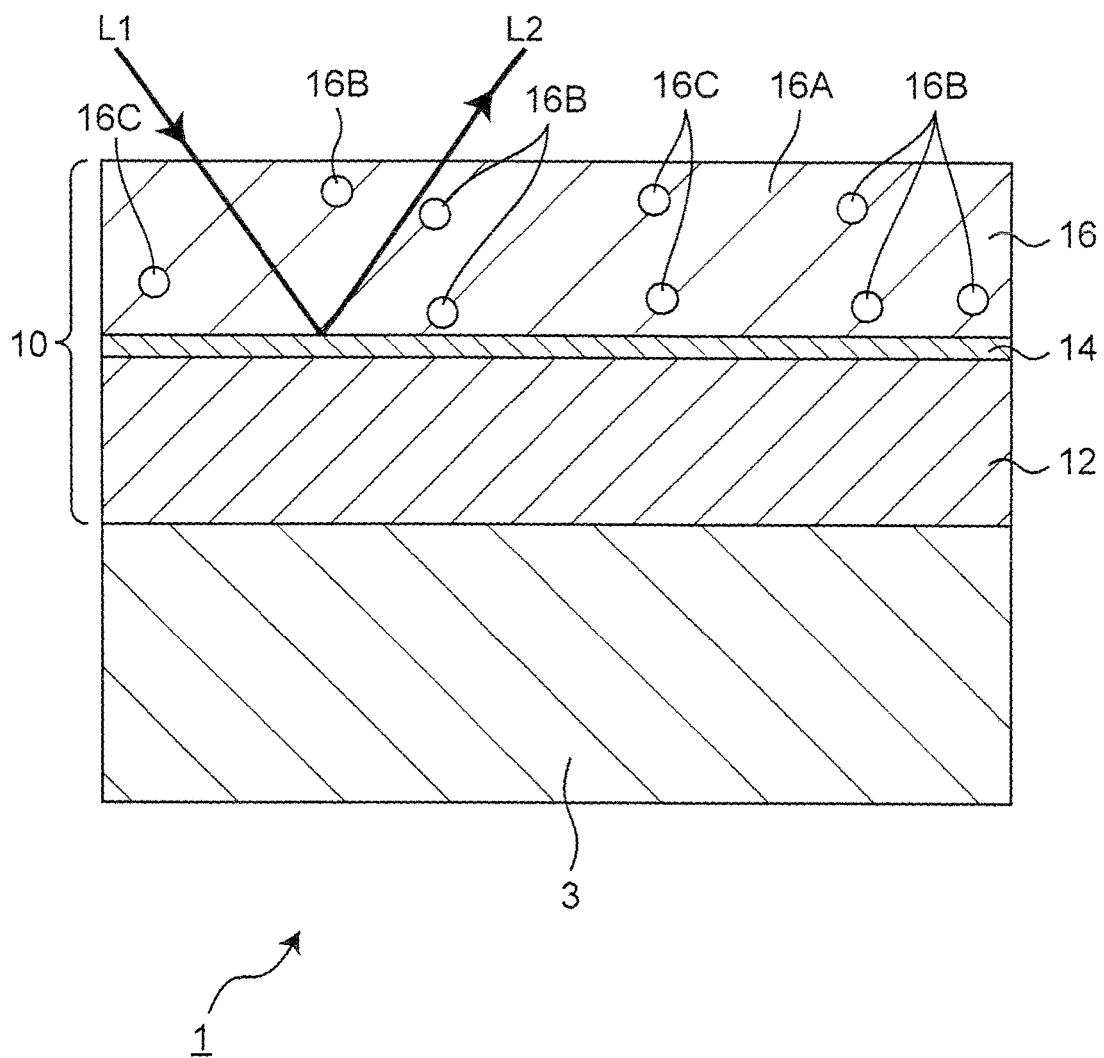
FIG. 8 is a schematic explanation diagram used for describing a metal gloss design member according to a sixth embodiment of the present invention and an optical effect thereof.

With reference to FIG. 8, the metal gloss design member 1 according to a sixth embodiment is described below in which the silver coating film 10 provided with the silver thin film 14 having a relatively high light reflectivity is formed on the substrate 3. The sixth embodiment is in common with the fifth embodiment except for the optical property of the silver thin film 14.

In the sixth embodiment shown in FIG. 8, the silver thin film 14 has a high light reflectance, that is, the thickness of the silver thin film 14 is sufficiently thick. Thus, a majority of incident light L1 is reflected by the silver thin film 14 and hence the incident light L1 becomes difficult to be transmitted through the silver thin film 14 in the stacking direction. When the incident light L1 is reflected by the silver thin film 14, light having substantially the same quantity as the incident light L1 having reached the silver thin film 14 passes through the topcoat layer 16 as reflected light L2 and then exits outward from the silver coating film 10. As a result, in the silver coating film 10 provided with the silver thin film 14 having a relatively high light reflectivity, the quantity of the light passing through the topcoat layer 16 becomes larger than in the silver thin film 14 having light transmissivity.

Thus, in the silver coating film 10 provided with the thick silver thin film 14 in which a majority of the incident light L1 is reflected by the silver thin film 14, similarly to the fifth embodiment, when the topcoat layer 16 has the property of absorbing ultraviolet light and infrared light serving as deterioration accelerating light, deterioration of the topcoat layer 16 is suppressed and weather resistance is improved. When weather resistance at a high level is not required, in some cases a weather resistance evaluation criterion is satisfied.

Figure 9A:
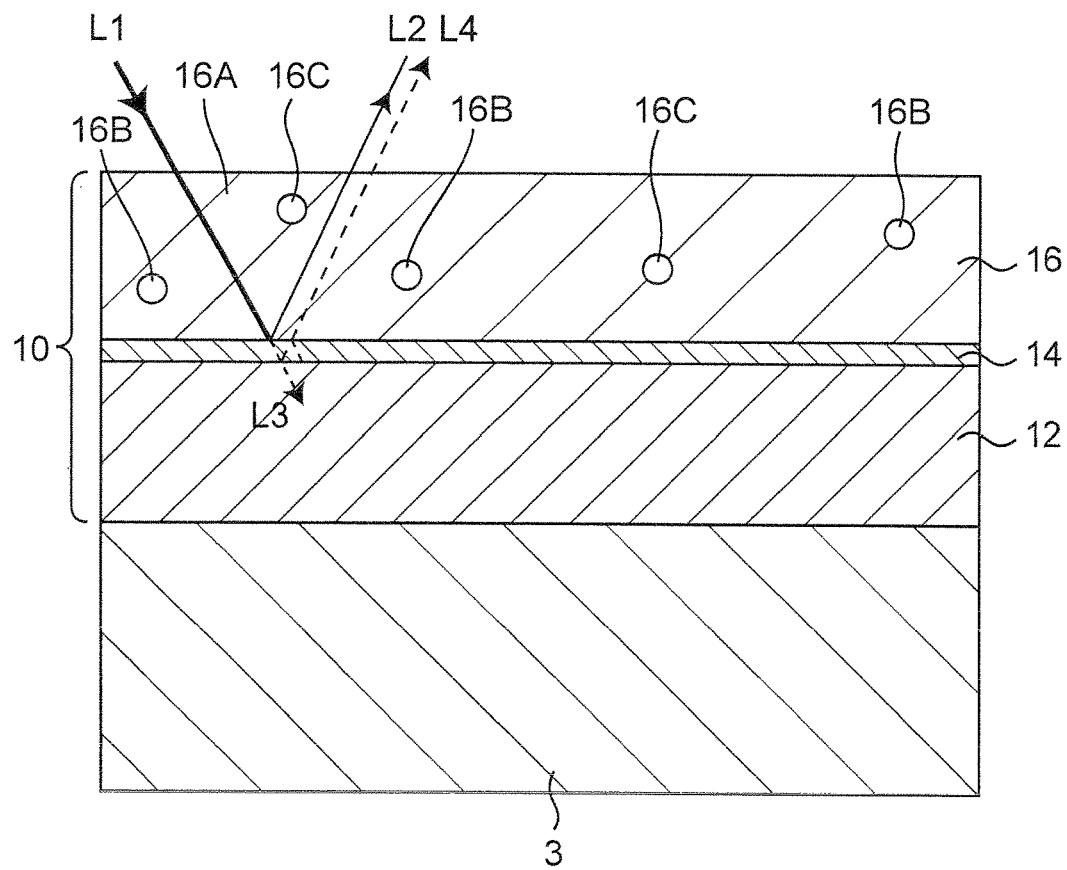
FIG. 9A is a schematic explanation diagram used for describing a metal gloss design member according to a seventh embodiment of the present invention and an optical effect thereof.
Figure 9B:
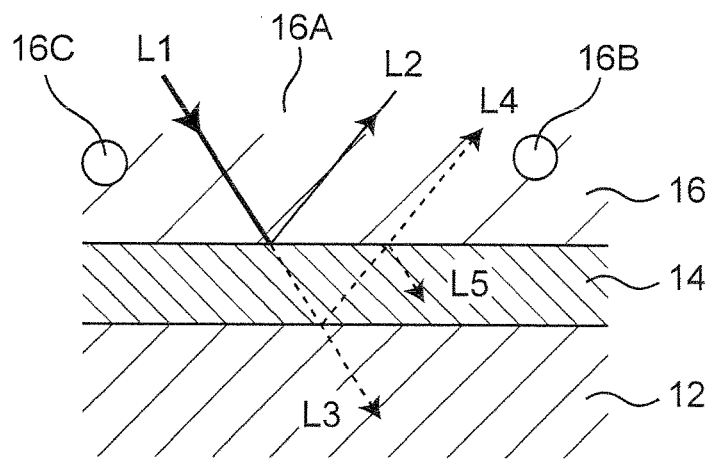
FIG. 9B is a main-part enlarged view used for describing an optical effect of a metal gloss design member shown in FIG. 9A.

With reference to FIGS. 9A and 9B, the metal gloss design member 1 according to a seventh embodiment is described below in which the silver coating film 10 provided with the topcoat layer 16 in which the property of absorbing deterioration accelerating light is not sufficient is formed on the substrate 3. The seventh embodiment is in common with the fifth embodiment except for the property of absorbing deterioration accelerating light in the topcoat layer 16.

In the seventh embodiment shown in FIGS. 9A and 9B, the property of absorbing deterioration accelerating light is not sufficient, that is, necessary amounts of the ultraviolet absorbing agent 16B and the infrared absorbing agent 16C like in the fifth embodiment are not contained. Thus, the ultraviolet light and the infrared light serving as deterioration accelerating light and passing through the topcoat layer 16 are not sufficiently absorbed.

Thus, in the coating film 10 provided with the topcoat layer 16 in which deterioration accelerating light is not sufficiently absorbed, similarly to the fifth embodiment, when the silver thin film 14 has light transmissivity, deterioration of the topcoat layer 16 is suppressed and weather resistance is improved. When weather resistance at a high level is not required, in some cases, a weather resistance evaluation criterion is satisfied.

Figure 10:
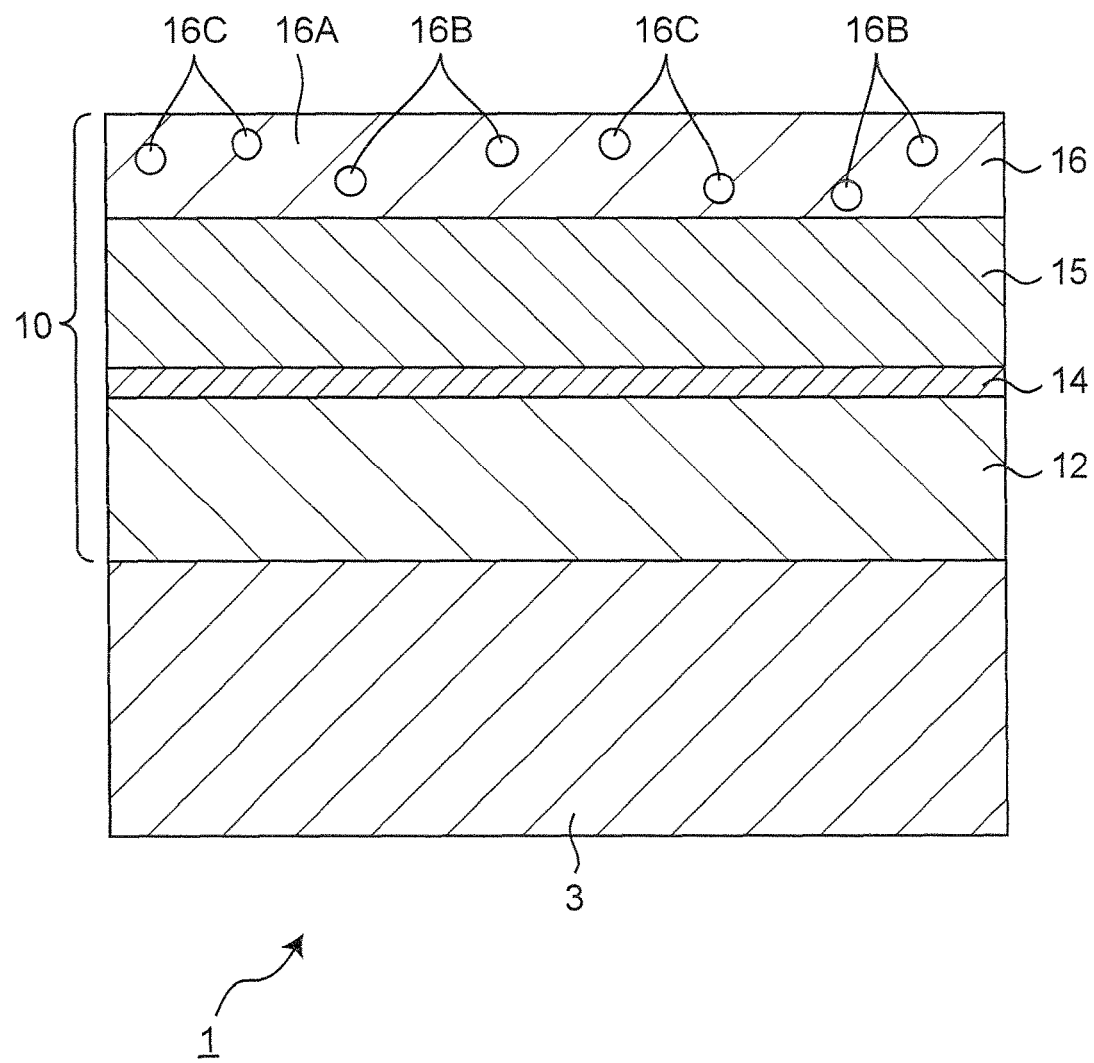
FIG. 10 is a schematic explanation diagram showing a metal gloss design member according to an eighth embodiment of the present invention.

Further, in the metal gloss design member 1 according to an eighth embodiment shown in FIG. 10, an undercoat layer 12, a silver thin film 14, an intermediate coat layer 15, and a topcoat layer 16 are stacked on the outer side in the stacking direction relative to the substrate 3. The configuration is similar to the fifth embodiment except for the intermediate coat layer 15. The intermediate coat layer 15 is formed for protecting the silver thin film 14 so as to stabilize the silver thin film 14. The intermediate coat layer 15 excels in the adhesion to the silver thin film 14 and to the topcoat layer 16. For example, the intermediate coat layer 15 may be composed of acrylic-silicone resin.

EXAMPLES

Examples according to the present invention are described below in detail. However, the present invention is not limited to the following examples. Here, the part and the percentage in the following description are based on the weight.

Example 1

As the substrate 3, a test piece formed of acrylonitrile butadiene styrene resin (ABS resin) was employed. Base resin of acrylic polyol (manufactured by Hyoukaken Co. Ltd., product name 'MFS Undercoat Black Base Resin', product code ML-K) and a curing agent of isocyanate (manufactured by Hyoukaken Co., Ltd., product name 'MFS Undercoat Black Curing Agent', product code ML-K (Revised AK21)) were mixed together at a predetermined ratio. Then, undercoat paint was prepared by mixing a black colorant (manufactured by Mitsubishi Chemical Corporation, product code 'MA100') into the base resin at a predetermined ratio and then mixing an organic solvent such as toluene, butyl acetate, and isobutyl acetate into the base resin at a predetermined ratio.

Figure 11:
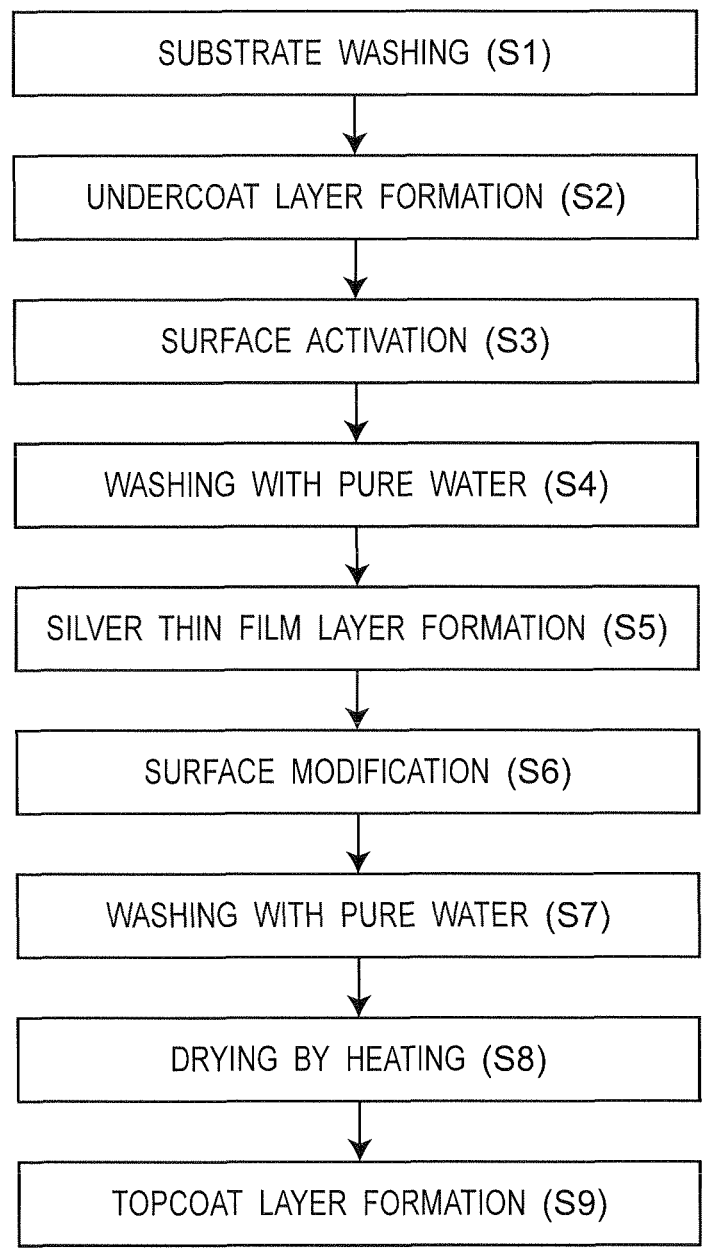
FIG. 11 is a flow chart showing a method for manufacturing a metal gloss design member according to the present invention.

As shown as step S1 in FIG. 11, the substrate 3 was degreased, washed, and dried and, after that, the undercoat paint was spray-coated onto the substrate 3 by using a spray gun. After that, drying by heating was performed under a predetermined heating condition so that the undercoat layer 12 (having a film thickness of 20 μm) was stacked on the substrate 3 (step S2 in FIG. 11).

As chemical liquids used for manufacturing the silver thin film 14, the following liquids were prepared.

Surface control agent AB: a surface control agent A (manufactured by Hyoukaken Co., Ltd., product code 'MFS-40A') and a surface control agent B (manufactured by Hyoukaken Co., Ltd., product code 'MFS-40B') are diluted with deionized water and then mixed together.

Silver mirror liquid AG agent: MFS base resin (manufactured by Hyoukaken Co., Ltd., product code 'MFS-10KJ') and an MFS subsidiary agent (manufactured by Hyoukaken Co., Ltd., product code 'MFS-20KJ') are diluted with deionized water and then mixed together.

Silver mirror liquid reducing agent: an MFS reducing agent (manufactured by Hyoukaken Co., Ltd., product code 'MFS-30KJ') is diluted with deionized water.

Corrosion inhibiting agent: a corrosion inhibiting agent (manufactured by Hyoukaken Co., Ltd., product code 'MFS-50') is diluted with deionized water.

Surface modifying agent D: a surface modifying agent (manufactured by Hyoukaken Co., Ltd., product code 'MFS-40D') is diluted with deionized water.

The test piece in which the undercoat layer 12 has been formed on the substrate 3 was washed with pure water (deionized water) and, after that, the surface of the undercoat layer 12 was activated by using the surface control agent AB (step S3 in FIG. 11). Washing with pure water (deionized water) was performed such that the surface control agent AB may not remain and then air blow was performed such that the water may not remain (step S4 in FIG. 11).

The silver mirror liquid AG agent and the silver mirror liquid reducing agent were simultaneously sprayed by using a dual head spray gun onto the undercoat layer 12 whose surface has been activated, and thereby a silver mirror reaction was performed on the surface of the undercoat layer 12 so that the silver thin film 14 (having a film thickness of 0.1 μm) was stacked on the undercoat layer 12 (step S5 in FIG. 11). The thickness of the silver thin film 14 was set such that light transmissivity and light reflectivity are obtained. Further, the corrosion inhibiting agent was sprayed and, after that, the surface modifying agent D was sprayed (step S6 in FIG. 11). Then, the test piece provided with the silver thin film 14 having undergone surface modification was washed with deionized water (step S7 in FIG. 11) and, after that, drying by heating was performed under a predetermined heating condition (step S8 in FIG. 11).

Base resin of acrylic polyol (manufactured by Saito Paint Co., Ltd. (developed by Fujimi Giken Co., Ltd.), product name 'FG Clear', product number 4207-065782) and a curing agent of isocyanate (manufactured by Saito Paint Co., Ltd. (developed by Fujimi Giken Co., Ltd.), product name 'FG Clear Curing agent', product number 6508-005784) were mixed together at a predetermined ratio and then an organic solvent such as toluene, butyl acetate, and isobutyl acetate was added so that topcoat paint was prepared. Here, a predetermined ratio of the ultraviolet absorbing agent 16B has been added to the base resin of acrylic polyol.

The topcoat paint was spray-coated by using a spray gun onto the silver thin film 14 in which surface modification has been performed with the surface modifying agent D. After that, drying by heating was performed under a predetermined heating condition so that the topcoat layer 16 (having a film thickness of 30 μm) was stacked on the silver thin film 14 (step S9 in FIG. 11). As a result, as shown in FIG. 1, the test piece of the metal gloss design member 1 was obtained in which the silver coating film 10 obtained by stacking the undercoat layer 12, the silver thin film 14, and the topcoat layer 16 on the outer side in the stacking direction relative to the substrate 3 was formed.

Example 2

Example 2 has a basically similar configuration to Example 1. However, the following description is given with focusing attenuation on a part different from Example 1. In Example 2, as shown in FIG. 5, the undercoat layer 12 and the silver thin film 14 are stacked on the outer side in the stacking direction relative to the substrate 3. However, the intermediate coat layer 15 is formed between the silver thin film 14 and the topcoat layer 16.

The intermediate coat layer 15 of acrylic silicone is composed of two-component acrylic-silicone resin consisting of: base resin of acrylic resin; and a curing agent in which 3-glycidoxypropyltrimethoxysilane (GPMS) and tetraethoxysilane (TES) are in a ratio of 1:1. The base resin and the curing agent were mixed together at a predetermined ratio so that intermediate-coat paint was prepared. Then, the intermediate-coat paint was spray-coated by using a spray gun onto the silver thin film 14 in which surface modification has been performed with the surface modifying agent D. After that, drying by heating was performed under a predetermined condition so that the intermediate coat layer 15 (having a film thickness of 20 μm) was stacked on the silver thin film 14.

Topcoat paint having the same composition as that of Example 1 was spray-coated onto the intermediate coat layer 15 of acrylic silicone by using a spray gun. After that, drying by heating was performed under a predetermined heating condition so that the topcoat layer 16 (having a film thickness of 20 μm) was stacked on the intermediate coat layer 15. As a result, as shown in FIG. 5, a test piece of the metal gloss design member 1 was obtained in which the silver coating film 10 obtained by stacking the undercoat layer 12, the silver thin film 14 having light transmissivity and light reflectivity, the intermediate coat layer 15, and the topcoat layer 16 onto the substrate 3 was formed.

Example 3

Example 3 is different from Example 1 in the points that the substrate 3 is composed of a metallic material (e.g., a cold rolled steel plate (an SPCC material)), that a rust preventing primer layer is provided between the substrate 3 and the undercoat layer 12, and that an ultraviolet-curing type clear layer is provided on the topcoat layer 16.

The rust preventing primer layer is composed of a primer coating material of epoxy resin. Then, a material having excellent corrosion resistance to the SPCC material as well as a satisfactory adhesion and a satisfactory water-penetration preventing property is employed. For example, the rust preventing primer layer is composed of Kapuron (trade name) manufactured by AS Paint Co., Ltd. The primer coating material was diluted with thinner and then spray-coated onto the substrate 3 by using a spray gun. After that, baking was performed under a predetermined condition so that a rust preventing primer layer (having a film thickness of 15 μm) was stacked on the substrate 3.

Similarly to Example 1, the undercoat layer 12, the silver thin film 14 having light transmissivity and light reflectivity, and the topcoat layer 16 were sequentially stacked on the test piece in which the rust preventing primer layer has been formed on the substrate 3 composed of the SPCC material. Then, a coating material for ultraviolet-curing type clear layer was spray-coated onto the topcoat layer 16 by using a spray gun.

In the coating material for ultraviolet-curing type clear layer, when irradiation with ultraviolet light (UV) is performed, a radical polymerization reaction occurs and hence hardening occurs so that a clear coat having a high-class feeling is obtained. For example, the coating material for ultraviolet-curing type clear layer is composed of acrylic oligomers, polymerizable acrylic monomers, and a photo-polymerization initiating agent. For example, the employed coating material for ultraviolet-curing type clear layer is Beam Coat (trade name) No. 3000 Clear KA4 manufactured by BASF Corporation. Then, the coating material for ultraviolet-curing type clear layer was spray-coated onto the topcoat layer 16 by using a spray gun. After that, the coating material for ultraviolet-curing type clear layer was irradiated with ultraviolet light by using an ultraviolet light source such as a high-pressure mercury vapor lamp and a metal halide lamp so as to be hardened so that an ultraviolet-curing type clear layer (having a film thickness of 15 μm) was stacked on the topcoat layer 16. As a result, a test piece of the metal gloss design member 1 was obtained in which the silver coating film 10 obtained by stacking the rust preventing primer layer, the undercoat layer 12, the silver thin film 14, the topcoat layer 16, and the ultraviolet-curing type clear layer on the outer side in the stacking direction relative to the substrate 3 was formed.

Example 4

As shown in FIG. 5, Example 4 is different from Example 3 in the point that the intermediate coat layer 15 described in Example 2 is provided between the silver thin film 14 and the topcoat layer 16. Thus, the metal gloss design member 1 has a configuration that the silver coating film 10 obtained by stacking the rust preventing primer layer, the undercoat layer 12, the silver thin film 14 having light transmissivity and light reflectivity, the intermediate coat layer 15, the topcoat layer 16, and the ultraviolet-curing type clear layer on the outer side in the stacking direction relative to the substrate 3 is formed.

Comparison Example 1

A test piece of the metal gloss design member 1 of Comparison Example 1 was obtained in which a silver coating film 10 obtained by stacking a topcoat layer 16 composed of acrylic-silicone resin not satisfying desired weather resistance in place of the topcoat layer 16 in the silver coating film 10 of Example 1 was formed.

Comparison Example 2

A test piece of the metal gloss design member 1 of Comparison Example 2 was obtained in which a silver coating film 10 obtained by stacking a topcoat layer 16 composed of acrylic polyol resin not satisfying desired weather resistance in place of the topcoat layer 16 in the silver coating film 10 of Example 2 was formed. The employed topcoat layer 16 was composed of acrylic polyol resin not containing the ultraviolet absorbing agent 16B.

Comparison Example 3

In place of the silver thin film 14 having light transmissivity and light reflectivity in the silver coating film 10 of Example 3, a silver thin film 14 of so-called full mirror having a high light reflectivity was employed. In place of the undercoat layer 12 containing a black colorant, an undercoat layer 12 not containing a colorant was employed. In place of the configuration that the topcoat layer 16 and the ultraviolet-curing type clear layer are stacked on the silver thin film 14, a resin composition obtained by adding a black colorant to the acrylic polyol resin employed in Comparison Example 2 was coated onto the silver thin film 14 so that a topcoat layer 16 was formed.

(Test Methods and Evaluation Results)

An adhesion test and a weather resistance test premising outdoor use were performed on the various kinds of test pieces of the metal gloss design member 1 obtained by the above-mentioned processes. The results are shown in Table 1.

Here, the adhesion test was performed on the basis of a cross-cut adhesion test method (JIS K 5400-8-5-2) and then the adhesion was evaluated according to the following judgment criteria.

"o" . . . excellent adhesion (50% or more of coating film squares are not peeled off)
"×" . . . unsatisfactory and unusable adhesion (peeling occurs in more than half of coating film squares)
"−" . . . adhesion is not evaluated Further, the weather resistance test was performed according to an accelerated weathering test (JIS K 5400) by using an accelerated weathering machine (manufactured by Suga Test Instruments Co., Ltd., product code 'WEL-SUN-HC') and a carbon-arc sunshine weather meter. After an elapsed time of 1000 hours, the degree of discoloration was evaluated as a color difference (SE) between an untested silver coating film 10 and the silver coating film 10 having undergone the test, by using a chromatic color-difference meter (manufactured by Konica Minolta, Inc., product code 'CR-400').

"o" . . . discoloration of the silver coating film is small (the color difference (ΔE) is smaller than or equal to 3)
"×" . . . discoloration of the silver coating film is large (the color difference (ΔE) is greater than or equal to 3 and discoloration was visually recognized)

TABLE 1

|  | Ex. 1 | Ex. 2 | Ex. 3 | Ex. 4 | Comp. Ex. 1 | Comp. Ex. 2 | Comp. Ex. 3 |
| --- | --- | --- | --- | --- | --- | --- | --- |
| Peeling test | o | o | o | o | — | — | x |
| Weather resistance test | o | o | o | o | x | x | x |

As shown in Table 1, in all of Examples 1 to 4, the evaluation criteria of the adhesion test and the weather resistance test were satisfied. In contrast, in Comparison Examples 1 to 3, the evaluation criterion of the weather resistance test was not satisfied. Thus, as seen from the test results of Examples 1 to 4, in the metal gloss design member 1 provided with the silver coating film 10 according to the present invention, even after outdoor use was performed over a long term, peeling and discoloration of the topcoat layer 16 are difficult to occur.

Here, the above-mentioned weather resistance test is used for evaluating weather resistance at a high level. Thus, in a case that weather resistance at a high level like in the above-mentioned weather resistance test is not required, in some cases, a weather resistance evaluation criterion is satisfied also in Comparison Examples 1 and 2 in which a deterioration suppression effect is obtained.

Examples that ABS resin and an SPCC material are employed as the substrate 3 have been described above. However, various resin materials other than the ABS resin and various metallic materials (such as iron, aluminum, stainless steel, copper, and brass or any one of these metallic materials having undergone surface treatment such as rust prevention) other than the SPCC material may be employed. Further, glass and ceramics may be employed as the substrate 3.

In the present specification, for example, the expression "the undercoat layer formed on the outer side in the stacking direction relative to the substrate" indicates abroad concept which is not limited to a configuration that the undercoat layer 12 is formed immediately on the substrate 3 and which includes also a configuration that the undercoat layer 12 is formed on other layers (e.g., the rust preventing primer layer) provided on the substrate 3. Similarly, the expression "the topcoat layer formed on the outer side in the stacking direction relative to the silver thin film" is a broad concept which is not limited to a configuration that the topcoat layer 16 is formed immediately on the silver thin film 14 and which includes also a configuration that the topcoat layer 16 is formed on other layers (e.g., the intermediate coat layer 15) provided on the silver thin film 14.

(Measurement of Spectral Transmittance of Topcoat Layer 16)

For the purpose of measurement of the spectral transmittance of the topcoat layer 16 over a wavelength range from ultraviolet to infrared, the following test pieces were manufactured. First, a composition serving as the raw material of the topcoat layer 16 was coated onto one side of a glass substrate (50 mm×50 mm×2 mm) by a spin coater. The topcoat layer 16 coated on the glass substrate was heated and dried under the same heating and drying condition as that in the film formation of the topcoat layer 16 in the silver coating film 10. As a result, a test piece was manufactured in which a coating film of the topcoat layer 16 having a thickness of 30 μm was formed. The spectral transmittance from ultraviolet to infrared of the topcoat layer 16 of the test piece was measured by using an ultraviolet visible near-infrared (UV-Vis/NIR) spectrophotometer (Model U-4100 manufactured by Hitachi, Ltd.). In each test piece used for measurement of the spectral transmittance, the topcoat layer 16 was composed of acrylic polyol resin containing the same ultraviolet absorbing agent 16B as that in Example 1 or, alternatively, the topcoat layer 16 was composed of acrylic polyol resin not containing the ultraviolet absorbing agent 16B like in Comparison Example 2.

Figure 12:
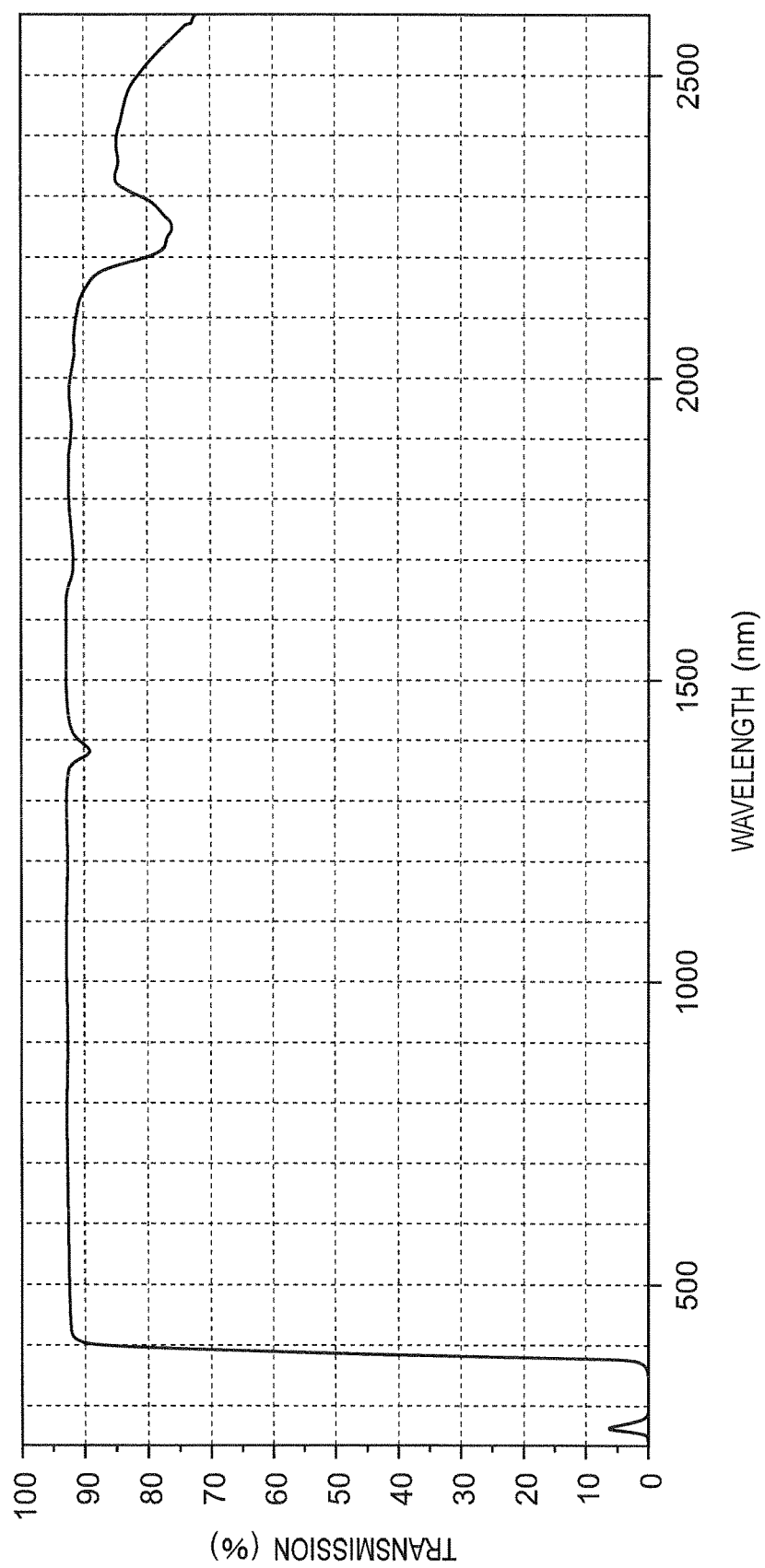
FIG. 12 is a graph showing the spectral transmittance of a topcoat layer containing an ultraviolet absorbing agent.
Figure 13:
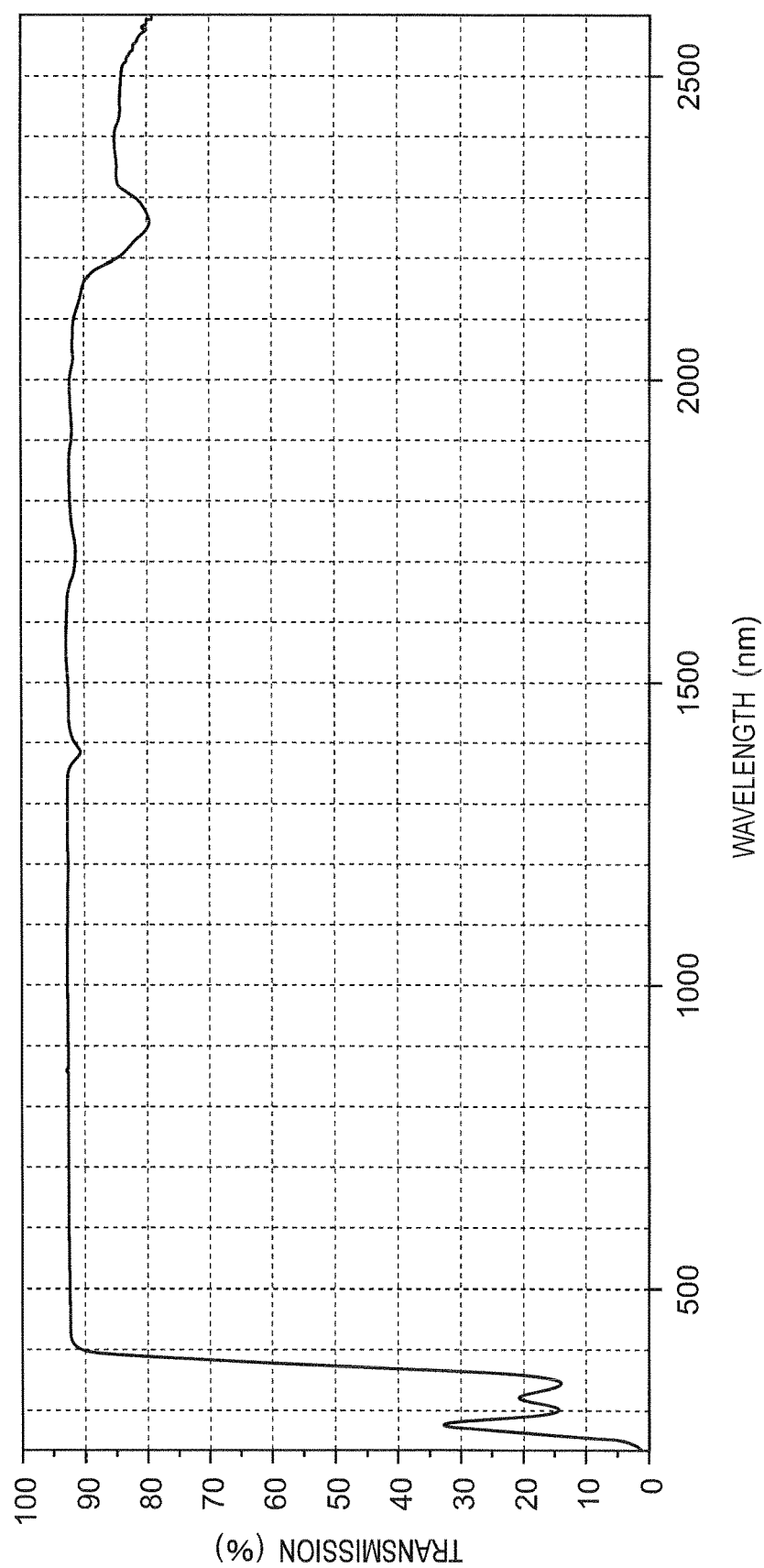
FIG. 13 is a graph showing the spectral transmittance of a topcoat layer containing an ultraviolet absorbing agent at a level required in general use.

In a state that an integrating sphere was attached to the spectrophotometer, the spectral transmittance was measured over a wavelength range from 240 nm to 2600 nm. An aluminum oxide white plate was adopted as the reference. Further, the incident angle was 0° and the sampling interval was 1 nm. Over a wavelength range from ultraviolet to visible (from 240 nm to 850 nm), measurement was performed with a slit width of 6 nm and a scan speed of 300 nm/min. Over a wavelength range of near-infrared (from 850 nm to 2600 nm), measurement was performed with an automatically controlled slit width and a scan speed of 750 nm/min. FIG. 12 shows the measurement result of the topcoat layer 16 in which the ultraviolet absorbing agent 16B was added. FIG. 13 shows the measurement result of the topcoat layer 16 in which the ultraviolet absorbing agent 16B at a level required in general use was added.

As shown in FIG. 12, the spectral transmittance over a wavelength range of visible light of the topcoat layer 16 in which the ultraviolet absorbing agent 16B was added is approximately 92%. When the wavelength goes to the short wavelength side shorter than 400 nm, that is, to the ultraviolet side, the spectral transmittance steeply decreases. Then, apart from a situation that a small absorption peak (of approximately 5%) is present at a wavelength of approximately 265 nm, the spectral transmittance becomes almost zero on the short wavelength side shorter than a wavelength of approximately 370 nm. That is, the ultraviolet transmission over a wavelength range from 320 nm to 370 nm is almost zero and hence ultraviolet light over a wavelength range expected to participate in acceleration of light deterioration is almost completely absorbed (shielded).

As shown in FIG. 13, the spectral transmittance over a wavelength range of visible light of the topcoat layer 16 in which the ultraviolet absorbing agent 16B at a level required in general use is added is approximately 92%. On the short wavelength side shorter than a wavelength of 400 nm, that is, on the ultraviolet side, the spectral transmittance steeply decreases. However, the spectral transmittance does not become zero. The ultraviolet transmission from 260 nm to 370 nm is higher than 15% and has a large absorption peak (of approximately 33%) at a wavelength of approximately 280 nm and a small absorption peak (of approximately 21%) at a wavelength of approximately 325 nm. The test piece shown in FIG. 13 has an unsatisfactory absorbability (an unsatisfactory light shielding property) for ultraviolet light over a wavelength range expected to participate in acceleration of light deterioration, in comparison with the test piece shown in FIG. 12.

(Measurement of Spectral Reflectivity of Silver Thin Film 14)

Next, for the purpose of measurement of the spectral reflectivity of the silver thin film 14 over a wavelength range from ultraviolet to infrared, the following test pieces were manufactured. First, the undercoat layer 12 was manufactured on one side of a glass substrate (50 mm×50 mm×2 mm). Then, a silver mirror reaction was performed on the surface of the undercoat layer 12 so that a test piece was manufactured in which the silver thin film 14 was stacked on the undercoat layer 12. The spectral reflectivity from ultraviolet to infrared of the silver thin film 14 of the test piece was measured by using an ultraviolet visible near-infrared (UV-Vis/NIR) spectrophotometer (Model U-4100 manufactured by Hitachi, Ltd.). Each test piece used for measurement of the spectral reflectivity was of a half mirror type in which the film thickness of the silver thin film 14 was 0.1 µm or, alternatively, of a full mirror type in which the film thickness of the silver thin film 14 was 1.0 µm.

In a state that an integrating sphere was attached to the spectrophotometer, the spectral reflectivity of the silver thin film 14 was measured over a wavelength range from 240 nm to 2600 nm. An aluminum oxide white plate was adopted as the reference. Further, the incident angle was 0° and the sampling interval was 1 nm. Over a wavelength range from ultraviolet to visible (from 240 nm to 850 nm), measurement was performed with a slit width of 6 nm and a scan speed of 300 nm/min. Over a wavelength range of near-infrared (from 850 nm to 2600 nm), measurement was performed with an automatically controlled slit width and a scan speed of 750 nm/min. The measurement result of the silver thin film 14 of half mirror type is shown in FIG. 14 and the measurement result of the silver thin film 14 of full mirror type is shown in FIG. 15.

Figure 14:
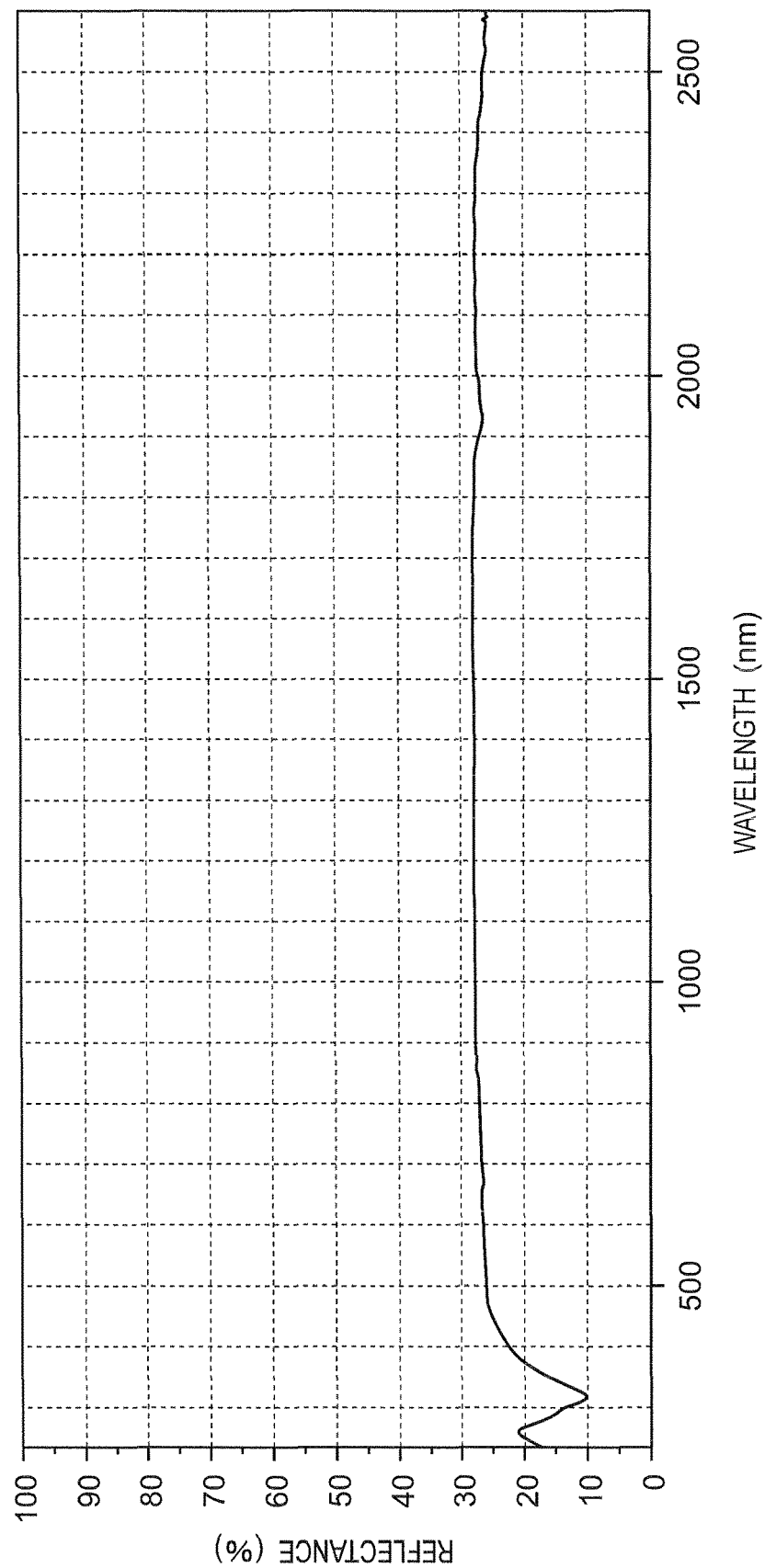
FIG. 14 is a graph showing the spectral reflectivity of a silver thin film of half mirror type.

As shown in FIG. 14, the spectral reflectivity over a wavelength range of visible light of the silver thin film 14 of half mirror type is approximately 22% to approximately 27%. Then, when the wavelength goes to the short wavelength side shorter than 400 nm, that is, to the ultraviolet side, the spectral reflectivity gradually decreases. Then, an absorption peak (of approximately 10%) appears at a wavelength of approximately 320 nm and, after that, a peak (of approximately 10%) in the spectral reflectivity appears at a wavelength of approximately 260 nm. That is, the spectral reflectivity over a wavelength range from ultraviolet to visible (from 240 nm to 850 nm) is low in the entirety and hence the measured light is transmitted to the glass substrate side and then absorbed.

Figure 15:
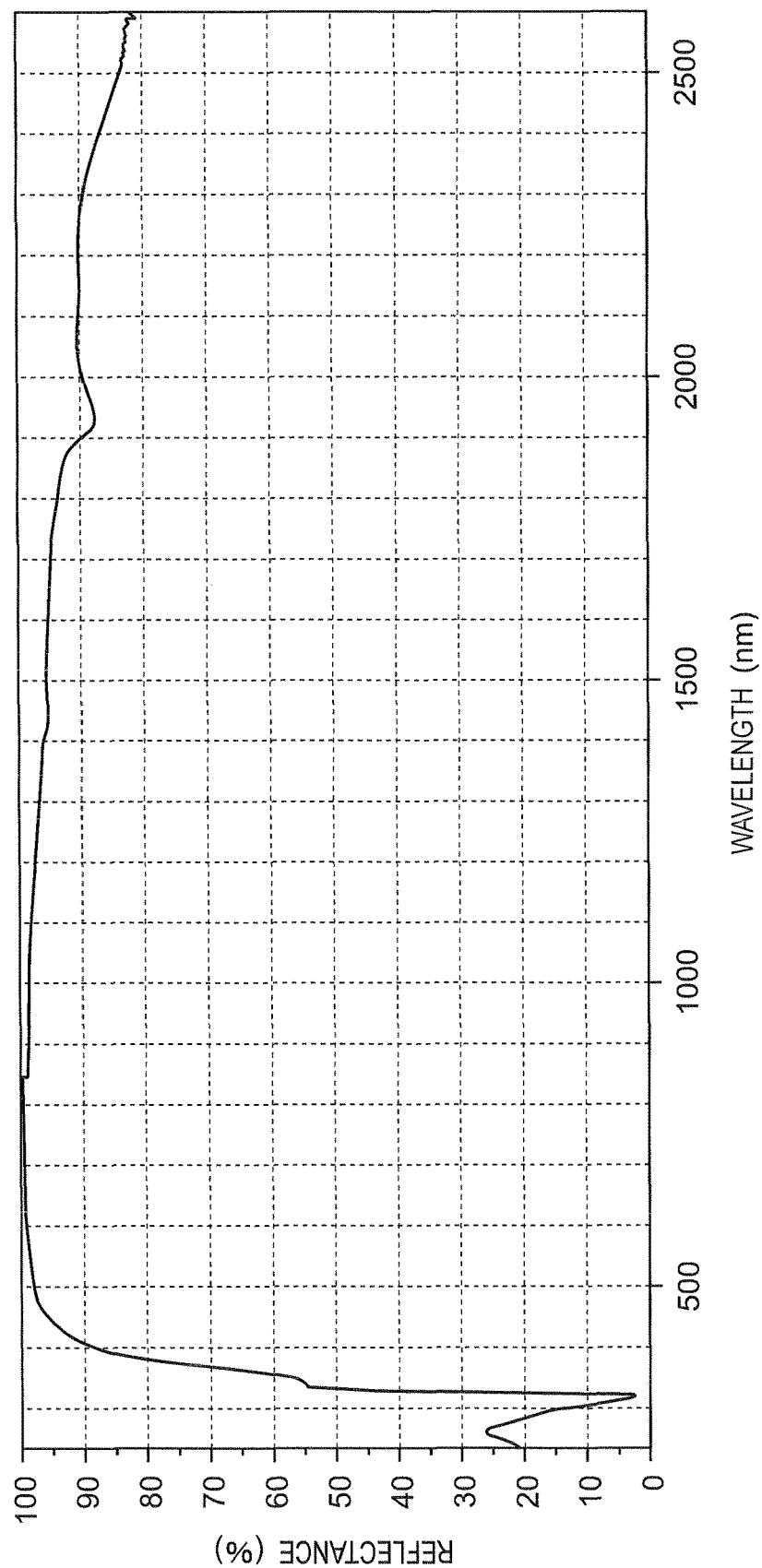
FIG. 15 is a graph showing the spectral reflectivity of a silver thin film of full mirror type.

As shown in FIG. 15, the spectral reflectivity over a wavelength range of visible light of the silver thin film 14 of full mirror type is approximately 89% to approximately 99%. Then, when the wavelength goes to the short wavelength side shorter than 400 nm, that is, to the ultraviolet side, the spectral reflectivity steeply decreases and hence absorption occurs. Then, an absorption peak (of approximately 2.5%) appears at a wavelength of approximately 320 nm and, after that, a peak (of approximately 26%) in the spectral reflectivity appears at a wavelength of approximately 260 nm. That is, the spectral reflectivity over a wavelength range from ultraviolet to visible (from 240 nm to 850 nm) is high in the entirety. In particular, a high spectral reflectivity exceeding approximately 95% is obtained over a wavelength range from 500 to 850 nm.

Here, when the topcoat layer 16 has ultraviolet absorbability, ultraviolet light serving as deterioration accelerating light is absorbed so that light deterioration of the topcoat layer 16 is suppressed. Thus, the silver coating film 10 need not unavoidably includes the undercoat layer 12.

The silver thin film 14 has light reflectivity of reflecting at least a part of the incident light. However, when the present invention is viewed from another perspective, as long as a configuration is employed that the silver thin film has light reflectivity and light transmissivity, the quantity of the light passing through the topcoat layer 16 can be reduced so that deterioration of the topcoat layer 16 can be suppressed. Thus, apart from the configuration that the topcoat layer 16 has ultraviolet absorbability, the configuration alone that the silver thin film 14 has light reflectivity and light transmissivity can provide a deterioration suppression effect for the topcoat layer 16.

Vehicles such as a motorcycle are used outdoors over a long term. Thus, a severe weather resistance standard at a high level is required than in products used indoors. The metal gloss design member 1 of the present invention satisfies the severe weather resistance standard and hence is preferably employed as an exterior component of various vehicles such as a motorcycle. For example, the metal gloss design member 1 is employed as a resin-manufactured cowl or a metal-manufactured fuel tank in a motorcycle.

As described above, according to the above-mentioned embodiment:

(1) The silver coating film 10 provided at least with the silver thin film 14 and with the topcoat layer 16 formed on the outer side in the stacking direction relative to the silver thin film 14 is formed on the substrate 3. Then, the topcoat layer 16 has ultraviolet absorbability. The quantity of the light passing through the topcoat layer 16 increases by the quantity of the reflected light reflected by the silver thin film 14. However, according to this configuration, in outdoor use, ultraviolet light contained in sunlight is absorbed by the topcoat layer 16 so that light deterioration by ultraviolet light is suppressed. Thus, even when the metal gloss design member 1 in which the silver coating film 10 containing the silver thin film 14 is formed is used outdoors over a long term, the topcoat layer 16 and the silver thin film 14 are difficult to be discolored and hence weather resistance is improved.

(2) The component and the content of the ultraviolet absorbing agent 16B can be adjusted such that the ultraviolet transmission (over a wavelength range from 320 nm to 370 nm) of the topcoat layer 16 may be 5% or lower, so that the topcoat layer 16 can be adjusted such as to be effective in deterioration suppression. Thus, the coating property and the light shielding property for deterioration accelerating light can simultaneously be satisfied in the topcoat layer 16.

(3) The silver thin film 14 has light transmissivity of transmitting light in the stacking direction. This reduces the reflected light reflected by the silver thin film 14 and hence further reduces the quantity of the light passing through the topcoat layer 16. Thus, deterioration of the topcoat layer 16 can be suppressed.

(4) The topcoat layer 16 is composed of two-component polyurethane resin (Base resin: product name 'FG Clear', product number 4207-065782. Curing agent: product name 'FG Clear Curing Agent', product number 6508-005784) manufactured by Saito Paint Co., Ltd. (developed by Fujimi Giken Co., Ltd.). This permits realization of required weather resistance.

(5) The undercoat layer formed 12 on the inner side in the stacking direction relative to the silver thin film 14 is composed of two-component polyurethane resin (Base resin: product name 'MFS Undercoat Black Base Resin', product code 'ML Type'. Curing agent: product name 'MFS Undercoat Black Curing Agent', product code 'ML Type' (Revised AK21)) manufactured by Hyoukaken Co., Ltd Thus, in addition to the weather resistance, a satisfactory adhesion to the substrate 3 and the silver thin film 14 is obtained.

(6) When the metal gloss design member 1 is a surface member of a vehicle, the metal gloss design member 1 can preferably be applied to the vehicle used outdoors over a long term and hence requiring severe weather resistance.

(7) The light reflection coating film 10 provided at least with the light reflection film 14 and with the topcoat layer 16 formed on the outer side in the stacking direction relative to the light reflection film 14 is formed on the substrate 3 and then the light reflection film 14 has light transmissivity of transmitting light toward the inner side in the stacking direction. This permits reduction of the quantity of the light reflected by the light reflection film 14 and then passing through the topcoat layer 16. Thus, light deterioration of the topcoat layer 16 is suppressed and weather resistance is improved.

(8) The method for manufacturing the metal gloss design member 1 includes: a step of forming an undercoat layer 12 onto a substrate 3 by employing two-component polyurethane resin (Base resin: product name 'MFS Undercoat Black Base Resin', product code 'ML Type'. Curing agent: product name 'MFS Undercoat Black Curing Agent', product code 'ML Type' (Revised AK21)) manufactured by Hyoukaken Co., Ltd.; a step of forming a silver thin film 14 onto the undercoat layer 12 by silver mirror painting; and a step of forming a topcoat layer 16 onto the silver thin film 14 by employing two-component polyurethane resin (Base resin: product name 'FG Clear', product number 4207-065782. Curing agent: product name 'FG Clear Curing Agent', product number 6508-005784) manufactured by Saito Paint Co., Ltd. (developed by Fujimi Giken Co., Ltd.). According to this method, the metal gloss design member 1 can be manufactured in which light deterioration by ultraviolet light is suppressed so that, even when used outdoors over a long term, peeling and discoloration of the topcoat layer 16 as well as discoloration such as whitening and blackening of the silver thin film 14 become difficult to occur and thereby weather resistance is improved.

Here, for simplicity of understanding of the present invention, description has been given by using particular configurations, materials, or numerical values. However, the present invention is not limited to the particular configurations, materials, or numerical values in the embodiments given above and may include various kinds of modifications without departing from the scope of the contents described in the claims.

In the description given above, as an example, the material for the undercoat layer 12 has been two-component polyurethane resin (Base resin: product name 'MFS Undercoat Black Base Resin', product code ML-K. Curing agent: product name 'MFS Undercoat Black Curing Agent', product code ML-K (Revised AK21)) manufactured by Hyoukaken Co., Ltd. Instead, for example, the base resin and the curing agent of two-component polyurethane resin (product code ML-K) manufactured by Hyoukaken. Co., Ltd. may also be employed. Further, another two-component polyurethane resin manufactured by a manufacturer other than Hyoukaken Co., Ltd. may also be employed as long as the resin has equivalent performance.

In the description given above, as an example, the material for the topcoat layer 16 has been two-component polyurethane resin (Base resin: product name 'SG Clear', product number 4207-065782. Curing agent: product name 'FG Clear Curing Agent', product number 6508-005784) manufactured by Saito Paint Co., Ltd. (developed by Fujimi Giken Co., Ltd.). Instead, for example, commercially available ultraviolet shielding paint (scattering prevention paint) US series manufactured by Fujimi Giken Co., Ltd. may also be employed. The ultraviolet shielding paint (scattering prevention paint) US series manufactured by Fujimi Giken Co., Ltd. has a product code US-A, US-B, or US-C. The paint of product code US-A has the performance of shielding 99% or more of light having a wavelength range of 10 nm or longer and 380 nm or shorter. The paint of product code US-B has the performance of shielding 99% or more of ultraviolet light having a wavelength 450 nm or shorter. The paint of product code US-C has the performance of shielding 99% or more of ultraviolet light having a wavelength 350 nm or shorter. The ultraviolet shielding paint (scattering prevention paint) US series manufactured by Fujimi Giken Co., Ltd. is focused on the shielding of ultraviolet light. However, another paint having weather resistance equivalent to that of the US series paint may also be employed as the ultraviolet absorbing agent 16B.

DESCRIPTION OF REFERENCE NUMERALS

1 Metal gloss design member
3 Resin-manufactured substrate
10 Silver coating film (light reflection coating film)
12 Undercoat layer
14 Silver thin film (light reflection film)
15 Intermediate coat layer
16 Topcoat layer
16A Resin paint
16B Ultraviolet absorbing agent
16C Infrared absorbing agent
L1 Incident light
L2 Reflected light
L3 Diffused light
L4 Thin-film transmitted light
L5 Turn-back light

What is claimed is:

1. A metal gloss design member comprising:
 a substrate used for a cowl or a fuel tank in a motorcycle;
 an undercoat layer disposed on an outer side in a stacking direction and directly on the substrate;
 a silver thin film disposed on the outer side in the stacking direction and directly on the undercoat layer without interposing an adhesive layer adhering by thermal melting; and
 a topcoat layer disposed on the outer side in the stacking direction relative to the silver thin film and having ultraviolet absorbability,
 wherein the undercoat layer is made of a two-component curable resin, and
 wherein the silver thin film functions as a two-way mirror with visible light reflectivity and visible light transmissivity by having a thickness of more than 0.05 μm and less than 0.1 μm and shows silver metal gloss.

2. The metal gloss design member according to claim 1, wherein the undercoat layer is made of a two-component polyurethane resin obtained by mixing a base resin and a curing agent.

3. The metal gloss design member according to claim 1, wherein the topcoat layer is made of a two-component curable resin.

4. The metal gloss design member according to claim 1, wherein the top coat layer is disposed directly on the silver thin film.

5. The metal gloss design member according to claim 1, wherein an intermediate coat layer is disposed on the outer side in the stacking direction and on the silver thin film, and
 wherein the top coat layer is disposed directly on the intermediate coat layer.

6. The metal gloss design member according to claim 1, wherein a thickness of the undercoat layer is 5 μm or greater and 30 μm or smaller.

7. A method for manufacturing a metal gloss design member, comprising:
 a first step of curing and forming an undercoat layer on an outer side in a stacking direction and directly on a substrate used for a cowl or a fuel tank in a motorcycle;
 a second step of forming a silver thin film on the outer side in the stacking direction directly on the undercoat layer cured in the first step without interposing an adhesive layer adhering by thermal melting; and
 a third step of forming a topcoat layer having ultraviolet absorptivity on the outer side in the stacking direction relative to the silver thin film formed in the second step,
 wherein in the first step, the undercoat layer is cured and formed by mixing a main resin and a curing agent for curing the main resin, and
 wherein the silver thin film formed in the second step functions as a two-way mirror with visible light reflectivity and visible light transmissivity by having a thickness of more than 0.05 μm and less than 0.1 μm and shows silver metal gloss.

8. The method according to claim 7, wherein in the first step, a resin composition cured and formed by mixing the main resin and the curing agent is dissolved in an organic solvent and coated onto the substrate.

* * * * *